United States Patent
Gül et al.

(10) Patent No.: US 12,041,219 B2
(45) Date of Patent: Jul. 16, 2024

(54) IMMERSIVE MEDIA CONTENT PRESENTATION AND INTERACTIVE 360° VIDEO COMMUNICATION

(71) Applicant: Fraunhofer-Gesellschaft zur Förderung der angewandten Forschung e.V., Munich (DE)

(72) Inventors: Serhan Gül, Berlin (DE); Yago Sánchez De La Fuente, Berlin (DE); Cornelius Hellge, Berlin (DE); Thomas Schierl, Berlin (DE); Robert Skupin, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/527,937

(22) Filed: Nov. 16, 2021

(65) Prior Publication Data
US 2022/0078396 A1 Mar. 10, 2022

Related U.S. Application Data

(63) Continuation of application No. PCT/EP2020/064111, filed on May 20, 2020.

(30) Foreign Application Priority Data

May 20, 2019 (EP) .................................... 19175477
Aug. 28, 2019 (EP) .................................... 19194172

(51) Int. Cl.
*H04N 21/81* (2011.01)
*H04N 13/161* (2018.01)
(Continued)

(52) U.S. Cl.
CPC ......... *H04N 13/194* (2018.05); *H04N 13/161* (2018.05); *H04N 13/172* (2018.05);
(Continued)

(58) Field of Classification Search
CPC .. H04N 13/194; H04N 13/161; H04N 13/172; H04N 13/332; H04N 13/366;
(Continued)

(56) References Cited

U.S. PATENT DOCUMENTS

| 2015/0249813 | A1 | 9/2015 | Cole et al. |
| 2016/0217760 | A1* | 7/2016 | Chu ..................... H04N 13/161 |

(Continued)

FOREIGN PATENT DOCUMENTS

| CN | 106063277 A | 10/2016 |
| CN | 106576158 A | 4/2017 |

(Continued)

OTHER PUBLICATIONS

Schulzrinne et al., "RTP: A Transport Protocol for Real-Time Applications", Network Working Group, RFC3550, Jul. 2003.
(Continued)

*Primary Examiner* — John R Schnurr
(74) *Attorney, Agent, or Firm* — NKL LAW; Jae Youn Kim

(57) ABSTRACT

An apparatus for presenting immersive media content is described. The apparatus obtains from a sender video data representing immersive content for a certain viewing direction and/or for a certain viewpoint, and displays the video data representing the immersive content for the certain viewing direction and/or for the certain viewpoint.

19 Claims, 7 Drawing Sheets

(51) Int. Cl.
| | |
|---|---|
| *H04N 13/172* | (2018.01) |
| *H04N 13/194* | (2018.01) |
| *H04N 13/332* | (2018.01) |
| *H04N 13/366* | (2018.01) |
| *H04N 21/218* | (2011.01) |
| *H04N 21/414* | (2011.01) |
| *H04N 21/6587* | (2011.01) |

(52) U.S. Cl.
CPC ......... *H04N 13/332* (2018.05); *H04N 13/366* (2018.05); *H04N 21/21805* (2013.01); *H04N 21/41407* (2013.01); *H04N 21/6587* (2013.01); *H04N 21/816* (2013.01)

(58) Field of Classification Search
CPC ....... H04N 21/21805; H04N 21/41407; H04N 21/6587; H04N 21/816; H04N 21/23418; H04N 21/23439; H04N 21/2402; H04N 21/2662; H04N 21/4302; H04N 21/438; H04N 21/44029; H04N 21/44209; H04N 21/4621; H04N 21/6373; H04N 21/4728; H04N 21/6125; H04N 21/6175; H04N 21/6437; H04N 13/383; H04N 7/14; H04N 13/359; H04N 21/64738; H04L 65/403; H04L 65/612; H04L 65/613; H04L 65/65; H04L 65/70; H04L 65/762; H04L 65/80
See application file for complete search history.

(56) References Cited

U.S. PATENT DOCUMENTS

| | | | |
|---|---|---|---|
| 2017/0103576 A1 | 4/2017 | DeFaria et al. | |
| 2017/0237964 A1 | 8/2017 | Maenpaa | |
| 2017/0302972 A1* | 10/2017 | Zhang | ............ H04L 69/24 |
| 2018/0241988 A1 | 8/2018 | Zhou et al. | |
| 2019/0104326 A1* | 4/2019 | Stockhammer | ...... H04N 21/816 |
| 2019/0114830 A1 | 4/2019 | Bouazizi et al. | |
| 2019/0158933 A1 | 5/2019 | Ouedraogo et al. | |
| 2020/0322403 A1* | 10/2020 | Dvir | ............ H04N 13/117 |

FOREIGN PATENT DOCUMENTS

| | | |
|---|---|---|
| CN | 108701369 A | 10/2018 |
| CN | 109155873 A | 1/2019 |
| JP | 2017-215875 A | 12/2017 |
| WO | 2018/069412 A1 | 4/2018 |
| WO | 2018093851 A1 | 5/2018 |
| WO | 2018/106548 A1 | 6/2018 |
| WO | 2018123646 A1 | 7/2018 |
| WO | 2019083266 A1 | 5/2019 |

OTHER PUBLICATIONS

Wang et al., RTP Payload Format for High Efficiency Video Coding (HEVC), Internet Engineering Task Force (IETF), RFC7798, Mar. 2016.

Singer et al., "A General Mechanism for RTP Header Extensions", Internet Engineering Task Force (IETF), RFC8285, Oct. 2017.

Ott et al., "Extended RTP Profile for Real-time Transport Control Protocol (RTCP)-Based Feedback (RTP/AVPF)", Network Working Group, RFC4585, Jul. 2006.

Friedman et al., RTP Control Protocol Extended Reports (RTCP XR), Network Working Group, RFC3611, Nov. 2003.

Ott et al., "Guidelines for Extending the RTP Control Protocol (RTCP)", Internet Engineering Task Force (IETF), RFC5968, Sep. 2010.

F. Andreasen, "Session Description Protocol (SDP) Capability Negotiation", Internet Engineering Task Force (IETF), RFC5939, Sep. 2010.

Camarillo et al., "Grouping of Media Lines in the Session Description Protocol (SDP)", Network Working Group, RFC3388, Dec. 2002.

3GPP TS 26.114 v16.0.0, "Multimedia Telephony, IMS Media Handling and Interaction", Dec. 2018.

3GPP TS 26.223 v16.0.0 Media Handling and Interaction, Rel. 16, Mar. 2019, XP051722973.

De La Fuente et al., "Delay Impact on MPEG OMAF's Tile-Based Viewport-Dependent 360° Video Streaming", IEEE Journal on Emerging and Selected Topics in Circuits and Systems, vol. 9, No. 1, Mar. 2019, pp. 18-28, XP011714058.

MPEG Medeia Transport (MMT), "Description of Core Experiments in MPEG Media Transport", International Organization for Standardisation ISO/IECJTC1/SC29/WG11 Coding of Moving Pictures and Audio, N16843_MPEG, Hobart, 2017_XP030023508, Apr. 2017, Hobart, Austrailia.

Feng Qian et al., "Optimizing 360 video delivery over cellular networks", All Things Cellular, ACM, Oct. 3, 2016, pp. 1-6, XP058280180.

Huszak et al., "Advanced free viewpoint video streaming techniques", Multimedia Tools and Applications, Kluwer Academic Publishers, vol. 76, No. 1, Nov. 11, 2015, pp. 373-396, XP036161697.

Yong He et al., "MPEG-I Architecture: VR Experience Metrics", International Organization for Standardisation ISO/IECJTC1/SC29/WG11, 119. MPEG Meeting Jul. 2017, m41120, Jul. 2017, Jul. 2017_XP030069463, Turin, Italy.

Yanan Bao; Tianxiao Zhang; Amit Pande; Huasen Wu; Xin Liu, Motion-Prediction-Based Multicast for 360-Degree Video Transmissions, 2017 14th Annual IEEE International Conference on Sensing, Communication, and Networking (SECON), USA, IEEE, Jun. 12, 2017.

Duc V. Nguyen; Huyen T. T. Tran; Anh T. Pham; Truong Cong Thang, An Optimal Tile-Based Approach for Viewport-Adaptive 360-Degree Video Streaming, IEEE Journal on Emerging and Selected Topics in Circuits and Systems, vol. 9, Issue: 1, Mar. 2019, USA, IEEE, Feb. 14, 2019, pp. 29-42.

Xia Lu, The Second Office Action, Application No. 202080043973.7, dated Dec. 23, 2023, 11pages, China National Intellectual Property Administration.

Xin Luo et al., "360 ° realistic 3D image display and image processing from real objects" Optical Review, 2016.

Mai Xu et al., "State-of-the-Art in 360° Video/Image Processing: Perception, Assessment and Compression", IEEE, Jan. 2020.

* cited by examiner

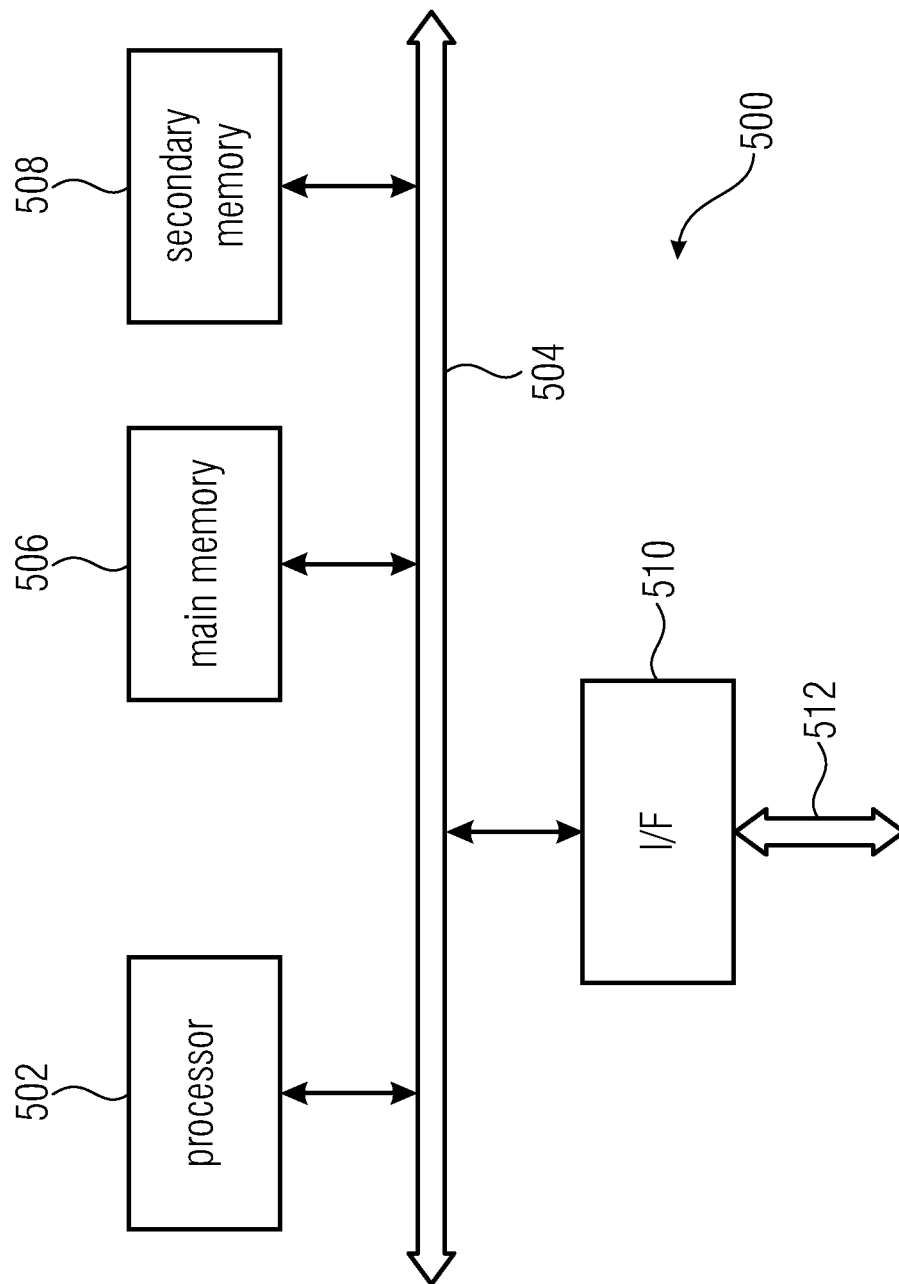

IMMERSIVE MEDIA CONTENT PRESENTATION AND INTERACTIVE 360° VIDEO COMMUNICATION

CROSS-REFERENCES TO RELATED APPLICATIONS

This application is a continuation of copending International Application No. PCT/EP2020/064111, filed May 20, 2020, which is incorporated herein by reference in its entirety, and additionally claims priority from European Applicant Nos. EP 19 175 477.9, filed May 20, 2019, and EP 19 194 172.3, filed Aug. 28, 2019, all of which are incorporated herein by reference in their entirety.

BACKGROUND OF THE INVENTION

The present invention relates to the field of immersive media and 360° video. Embodiments of the inventive approach concern improvements for immersive media communication or immersive media content presentation including, for example, video on demand, VoD, streaming, live streaming, video conferencing or virtual reality, VR, applications such as online gaming applications. Embodiments of the inventive approach concern improvements for a 360° video communication including, for example, video conferencing or virtual reality, VR, applications such as online gaming applications.

Immersive media has been gaining a lot of attention in the last years. Key technologies for the presentation or representation of immersive media content may be categorized into (i) 3DoF, three Degrees of Freedom, content, e.g. 360° videos,
(ii) 6DoF, six Degrees of Freedom, content, e.g., captured volumetric objects, like real objects, or volumetric videos of, e.g., real objects,
(iii) 3D objects generated using, e.g., computer graphics, like Computer-Generated Imagery, CGI, and consisting, e.g., of 3D meshes and 2D textures.

A combination of these technologies is also possible. For example, multiple volumetric objects may be presented to a user with overlaid on a 360° video played in the background. The presented volumetric objects may be dynamic sequences or computer-generated 3D objects.

360° video gained a lot of attention in the last years and some products for 360° applications appeared on the market. Standardization activities specify streaming and encoding of 360° video data. The work in this field primarily focuses on streaming of 360° video using the Hypertext Transfer Protocol, HTTP, or broadcast/broadband transmissions.

An enabling technology that has recently become the center of attention for various immersive applications is volumetric video. Volumetric videos capture the three-dimensional space in a realistic way and may provide a better immersion compared to 360° videos. Volumetric videos are also suitable for the representation of six degrees-of-freedom, 6DoF, content allowing a viewer to freely move inside the content and observe the volumetric objects from different points of views and distances.

Recently, various technologies have been emerging for capturing, processing, compressing and streaming of volumetric content. One prominent example in the compression domain is the Video-based Point Cloud Compression, V-PCC, standard. V-PCC encodes a point cloud into different video bitstreams, like texture, geometry, occupancy map, plus additional metadata. Applying existing video compression algorithms for point cloud compression brings very high compression efficiency and enables re-using the available hardware video decoders especially on mobile devices.

Different to the 360° videos, volumetric videos are usually represented in 3D formats, e.g. point clouds, meshes and the like, which may require different processing and transmission techniques for efficient delivery. When multiple volumetric objects, captured or computer-generated, are present in a scene, the positions and relations of the objects with each other may be described using a scene graph whose nodes represent the entities present in the scene. A scene description language, e.g. X3D, may be used to construct the scene graph that describes the objects. Delivering multiple 3D objects may increase the bandwidth requirements and require tight synchronization of the playback of the volumetric objects.

Video communication typically runs over RTP/RTCP (Real-Time/Real-Time Control Protocol). In RTP, access units, AUs, are split into RTP packets which contain a header and the content of the video. Before the actual transmission of the video, a negotiation phase typically occurs during which both end points, the server and the receiver, exchange capabilities and agree on the characteristics of the video and modes to be used for the video communication. In order to describe characteristics of the transmitted bitstream as well as the transmission mode in use, the Session Description Protocol, SDP, may be used. The SDP may be used for a capabilities negotiation. For example, when considering a High Efficiency Video Coding, HEVC, bitstream, the server may send respective parameters sets, e.g., the sprop-parameter-sets, wherein the transmission may be out-of-band, i.e., may not be within the actual transmission of the video data. The client may accept the parameters as they are. An example for a SDP negotiation is given below, and the parameter sets #0 may be stored and used by the encoder of the server and the decoder of the client, while the parameter sets #1 may be used by the encoder of the client and the decoder of the sender.

Sender:
m=video 49170 RTP/AVP 98
a=rtpmap:98 H265/90000
a=fmtp:98 level-id=90; //Main profile, Level 3.0
   sprop-vps=<vps data #0>
   sprop-sps=<sps data #0>
   sprop-pps=<pps data #0>
Client:
m=video 49170 RTP/AVP 98
a=rtpmap:98 H265/90000
a=fmtp:98 level-id=90; //Main profile, Level 3.0
   sprop-vps=<vps data #1>
   sprop-sps=<sps data #1>
   sprop-pps=<pps data #1>

A further example for a SDP negotiation is given below, which is similar to the above example, however with a level downgrade. The parameter sets #0 are ignored and may come in-band, i.e., during the transmission of the actual video data.

Sender:
m=video 49170 RTP/AVP 98
a=rtpmap:98 H265/90000
a=fmtp:98 level-id=120; //Main profile, Level 4.0
   sprop-vps=<vps data #0>
   sprop-sps=<sps data #0>
   sprop-pps=<pps data #0>
Client:
m=video 49170 RTP/AVP 98
a=rtpmap:98 H265/90000 a=fmtp:98 level-id=90; //Main profile, Level 3.0
   sprop-vps=<vps data #1>
   sprop-sps=<sps data #1>
   sprop-pps=<pps data #1>

In addition to the media description as shown in the above examples, SDP may also be used for capabilities negotiation and selection of different configurations. For example, RFC 5939 extends the SDP by defining an SDP Capability Negotiation, SDPCapNeg, solution that enables not just the SDP for the actual configuration but also one or more alternative SDP session description, also referred to as potential configurations. Dependent on whether the actual configuration or one of the potential configurations is chosen, it may be necessary that the server performs further processing so as to implement to the selected configuration. Potential configurations are provided on top of the configuration included in the m-line of the SDP message. For example, in case a server wants to establish a secure RTP, SRTP, media stream but may also accept plain RTP, the server puts plain RTP in the actual configuration and SRTP as a potential configuration. The client may use the plain RTP in case the client does not support SRTP or does not understand SDPCapNeg.

SDPCapNeg defines additional SDP attributes to express capabilities and to negotiate configurations. More specifically, the following additional attributes may be used:
   "a=acap" defines how to list an attribute name and its value as a capability.
   "a=tcap" defines how to list transport protocols, for example the RTP audio/video profile, RTP/AVP, as capabilities.
   "a=pcfg" lists supported potential configurations, wherein a potential configuration may include attribute capabilities, transport capabilities or combinations thereof. The capabilities may be used to generate an alternative SDP session description that may be used by a conventional SDP procedure or by the negotiation procedure.
   "a=acfg" is an attribute that may be used by the client to identify a potential configuration provided by the server.

Below, an example for an SDP negotiation using SDP-CapNeg is given.
V=0
o=−25678 753849 IN IP4 192.0.2.1
s=
c=IN IP4 192.0.2.1
t=0 0
m=audio 53456 RTP/AVP 0 18
a=tcap:1 RTP/SAVP RTP/SAVPF
a=acap:1 crypto:1 AES_CM_128_HMAC_SHA1_32 inline:NzB4d1BINUAvLEw6UzF3WSJ+PSdFcGdUJShpX1Zj|2^20|1:32
   a=pcfg:1 t=1 a=1
   a=pcfg:2 t=2 a=1

In the above example, two potential configurations are indicated by the attribute a=pcfg:1 and a=pcfg:2. The first potential configuration indicates t=1 and a=1 meaning that the first transport capability indicated by the attribute a=tcap, namely RTP/SAVP, Real-Time Transport Protocol/Secure Audio Video Profile, is provided for the first potential configuration with the attribute capability indicated in a=acap to be crypto:1: . . . . In a similar way, the second potential configuration indicates t=2 and a=1 meaning that the second transport capability indicated in a=tcap is used, namely RTP/SAVPF (RTP/SAVPF= . . . ) with the attribute capability indicated in a=acap to be crypto:1: . . .

In addition to a SDP negotiation, which may be used for a configuration before the actual video transmission starts, a real-time control protocol, RTCP, which is typically used together with the RTP, may be used as a feedback mechanism to control encoding modes during the session. RTCP may typically be used for RTP stream synchronization, packet loss reporting, delay estimation and the like. It may also be used as a feedback channel to control video coding parameters. For example, in the HEVC payload format, there may be the following parameters to be controlled:
   Picture Loss Indication, PLI: an indication of a loss of an undefined amount of coded video data belonging to one or more pictures.
   Slice Loss Indication, SLI: an indication of a loss of a number of CTBs in a CTB raster scan (CTB=Coding Tree Block).
   Reference Picture Selection Indication, RPSI: the selection of reference pictures to avoid error propagation.
   Full Intra Request, FIR: a message to force an encoder to send an IDR (IDR=Instantaneous Decoder Refresh).

RTCP control packets may be periodically exchanged among the end points of the video communication. In a point-to-point scenario, the RTP sender and the RTP receiver may send reciprocal sender reports, SR, and receiver reports, RR, to each other. The RTCP receiver report, RR, may indicate a reception quality and may include one or more of the following Quality of Service, QoS, metrics:
   cumulative number of packets lost,
   loss fraction,
   interarrival jitter,
   timing information.
The timing information may include
   a time stamp of a last SR, LSR, received, and
   a delay since the last SR received, DLSR.

The sender may use the LSR and the DLSR fields to calculate a round trip time, RTT, between the sender and the receiver.

FIG. 1 illustrates an example for calculating the RTT using respective RTCP reports exchanged between a sender and a receiver. Initially, as is indicated at 100, the sender sends a sender report SR to the receiver including the timing information indicated at 102. The receiver, after receiving SR, transmits its receiver report RR as is indicated at 104, and the receiver report includes the LSR and the DLSR fields. Upon receiving the RR at the sender, as indicated in 106, determines the actual time as indicated at 108 and calculates the RTT as indicated in 110. More specifically, the sender determines the arrival time 110a, also referred to as the actual time, and subtracts DLSR 110b and LSR 110c from the actual time 110a so as to obtain RTT. The calculated time is the network RTT and excludes any processing at the end points, for example a buffering delay at the receiver to smooth jitter or the like. The sender may use the known RTT so as to optimize the video encoding.

Some applications, such as multicast inference of network characteristics, MINC, or voice-over IP, VoIP, monitoring, require other and more detailed statistics. For example, RFC 3611 (RTCP extended reports) provides some extensions. For example, the receiver reference time report block extends time stamps of the RTCP in such a way that non-senders may also send time stamp. In other words, a receiver may also estimate the RTT when compared to other participants by sending the report and receiving DLRR reports as they are defined in RFC 3611 (DLRR=a delay since the last RR received).

Typically, RTCP packets are not sent individually but are packed into compound packets for transmission and are sent in relatively large time intervals so that the overhead caused by the RTCP packets does not drastically increase, advantageously it is kept around 5% of the traffic. In addition, a minimum interval, for example about 5 seconds, between RTCP reports may be recommended. However, some applications may require fast reporting, and to achieve a timely feedback, the extended RTP profile for RTCP-based feedback (RTP/AVPF) as defined in RFC 4585 introduces the concept of early RTCP messages as well as algorithms allowing for low-delay feedback in small multicast groups and preventing feedback implosion in large groups. There are three operation modes in RTP/AVPF, namely:

immediate feedback,
    early RTCP mode,
    regular RTCP mode.

A receiver may send a feedback message earlier than the next regular RTCP reporting interval by using the immediate feedback mode. These techniques may be used to define application specific messages that allow controlling or steering or influencing encoding techniques or decisions for delay critical situations. An example for the use of RTCP feedback messages may be found in 3GPP TS 26.114 (IMS Media Handling and Interaction). 3GPP TS 26.114 specifies different "rtcp-fb" attribute values in the SDP so as to convey, (i) a video region-of-interest ROI, arbitrarily selected by the receiver, and
(ii) a video ROI pre-defined by the sender and selected by the receiver as stated in 3GPP TS 26.114, Section 7.3.7.

An example of an RTCP feedback message indicating a certain position within a larger image, namely the ROI, may be specified as follows:

```
 0 1 2 3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Position_X (h) | Position_X (l) | Position_Y (h) | Position_Y (l) |
+-+-+-+-+-+-+-+-+-+-+-+-+-+-+-+-+-+-+-+-+-+-+-+-+-+-+-+-+-+-+-+-+
| Size_X (h)     | Size_X (l)     | Size_Y (h)     | Size_Y (l)     |
+-+-+-+-+-+-+-+-+-+-+-+-+-+-+-+-+-+-+-+-+-+-+-+-+-+-+-+-+-+-+-+-+
```

SUMMARY

An embodiment may have an apparatus for a 360° video communication with a sender, wherein the apparatus is to acquire from the sender video data dependent on a certain viewing direction of a 360° video, and display the video data representing the certain viewing direction of the 360° video, wherein the video data comprises a margin area around the viewport.

Another embodiment may have an apparatus for a 360° video communication with a receiver, wherein the apparatus is to receive from the receiver an indication of a certain viewing direction of a 360° video at the receiver, and transmit video data for the certain viewing direction of a 360° video to the receiver, wherein the video data comprises a margin area around the viewport.

Another embodiment may have a 360° video communication system, comprising: a sender comprising an apparatus according to the invention, and a receiver comprising an apparatus according to the invention.

Another embodiment may have a method for a 360° video communication, the method comprising: receiving, at a sender, an indication from a receiver of a certain viewing direction of a 360° video at the receiver, and transmitting, by the sender, video data for the certain viewing direction of a 360° video to the receiver, wherein the video data comprises a margin area around the viewport.

Another embodiment may have a non-transitory digital storage medium having a computer program stored thereon to perform the method for a 360° video communication, the method comprising: receiving, at a sender, an indication from a receiver of a certain viewing direction of a 360° video at the receiver, and transmitting, by the sender, video data for the certain viewing direction of a 360° video to the receiver, wherein the video data comprises a margin area around the viewport, when said computer program is run by a computer.

BRIEF DESCRIPTION OF THE DRAWINGS

Embodiments of the present invention will be detailed subsequently referring to the appended drawings, in which:

FIG. 7 illustrates an example of a computer system on which units or modules as well as the steps of the methods described in accordance with the inventive approach may execute.

DETAILED DESCRIPTION OF THE INVENTION

Embodiments of the present invention are now described in more detail with reference to the accompanying drawings, in which the same or similar elements have the same reference signs assigned.

In streaming applications the 360° video data for the entire 360° video is provided by a server towards a client, e.g., over the air by a broadcast/broadband transmission or over a network, like the internet, using HTTP, and the client renders the received video data for display. Thus, the entire video content is provided to the receiver. In video communication applications, for example, video conferencing or virtual reality, VR, applications such as online gaming applications, in general only a part of a scene of the 360° video is presented to a user at the receiver, e.g., dependent on a viewing direction of the user. The client, on the basis of the viewing direction, processes the entire video data so as to display to a user that part of the scene of the 360° video corresponding to the user's viewing direction. However, providing the entire video data for the 360° video to the receiver requires high transmission capabilities of the link between the sender and the receiver. Also, the receiver needs to have sufficient processing power to process the entire video data so as to present the desired part of a scene to a user. Since some the 360° video communication applications may be real time applications, the long duration or time associated with the transmission and/or processing of the entire data may be disadvantageous.

The above-described protocols, like RTP, RTCP and SDP provide mechanisms and signaling for the transmission of video data, the existing mechanisms and signaling are not specific for a 360° video communication so that using the known mechanisms and signaling may be disadvantageous.

Embodiments of the present invention provide different aspects for improving immersive media communication or immersive media content presentation. Embodiments of the present invention provide different aspects for improving a 360° video communication.

Figure 1:
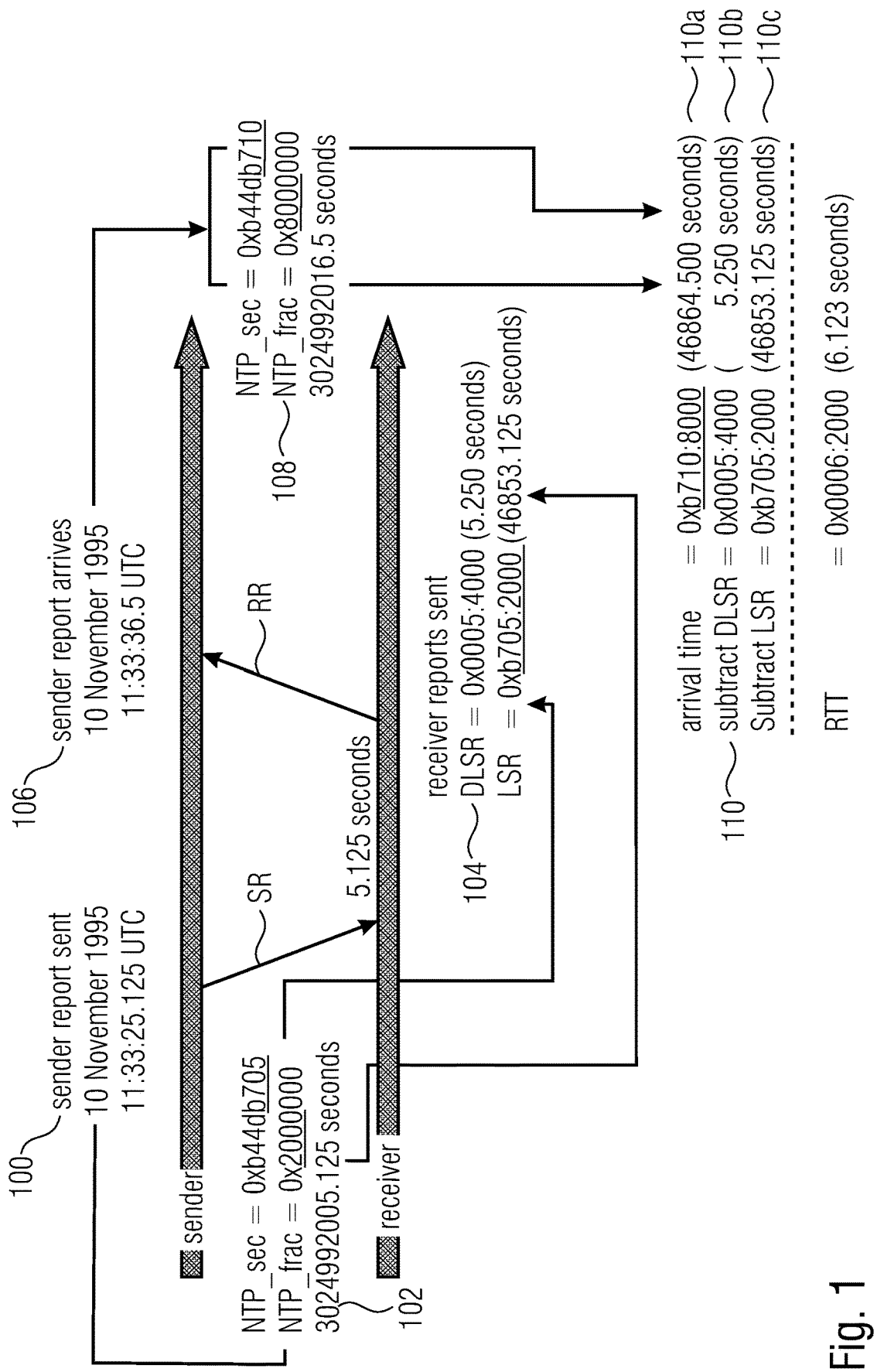
FIG. 1 illustrates an example for calculating the RTT using respective RTCP reports exchanged between a sender and a receiver.
Figure 2:
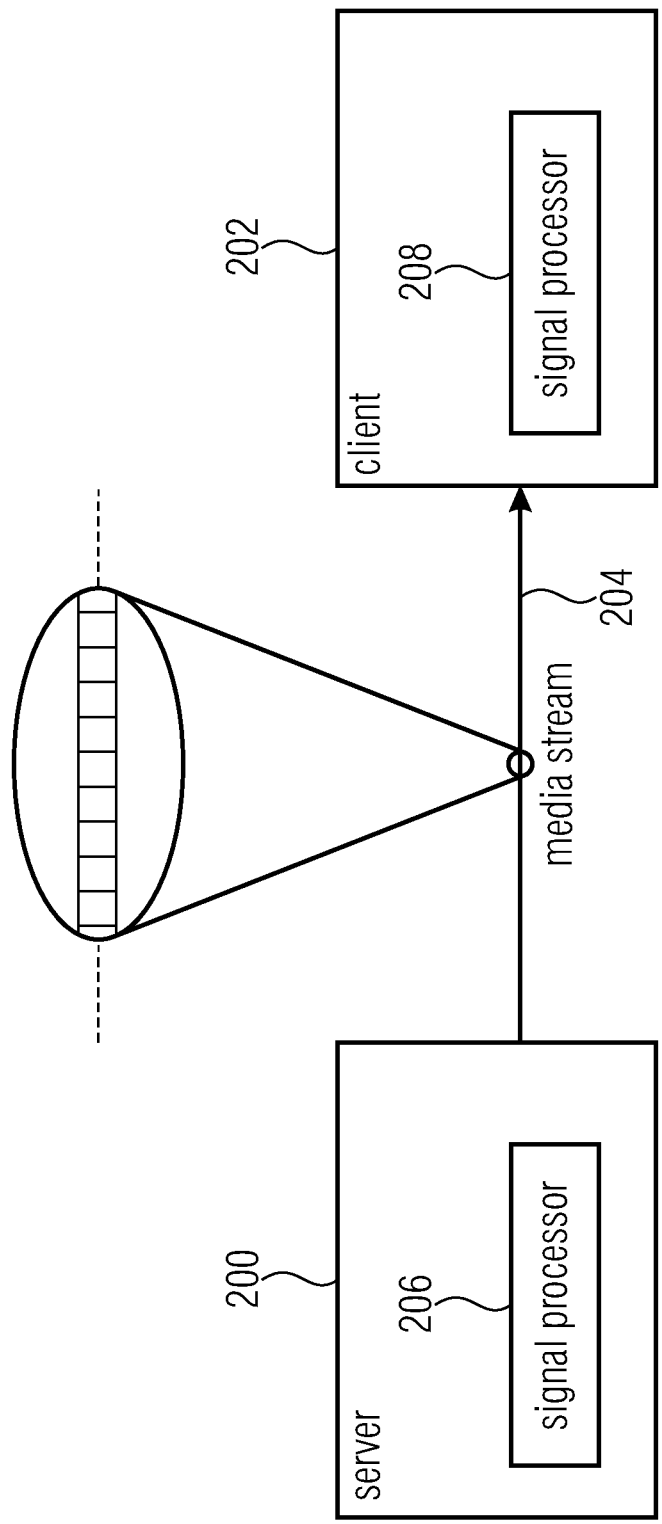
FIG. 2 is a schematic representation of a system for a 360° video communication between a sender and a receiver.

FIG. 2 is a schematic representation of a system for a immersive media communication or a 360° video communication between a sender 200, also referred to as a server, and a receiver 202, also referred to as a client. The server 200 and the client 202 may communicate via a wired communication link or via a wireless communication link for transmitting a media stream 204 including video or picture and/or audio information. More specifically, the media stream 204 includes the 360° video data as provided by the server 200, for example in respective RTP packets.

In addition, respective RTCP packets are included in the media stream as explained above. In accordance with embodiments of the present invention, the RTP, RTCP and SDP are extended so as to provide a mechanism and a signaling for an improved and more efficient immersive media communication or immersive media content presentation or for an improved and more efficient 360° video communication. The server 200 includes a signal processor 206, and the client 202 includes a signal processor 208. The client 202 as well as the server 200 may operate in accordance with the inventive teaching described herein below in more detail.

Receiver/Client for Immersive Media Presentation

The present invention provides (see for example claim 1) an apparatus for presenting immersive media content, wherein the apparatus is to obtain from a sender video data representing immersive content for a certain viewing direction and/or for a certain viewpoint, and display the video data representing the immersive content for the certain viewing direction and/or for the certain viewpoint.

In accordance with embodiments (see for example claim 2), to obtain the video data from the sender, the apparatus is to
  signal to the sender the certain viewing direction and/or the certain viewpoint, and
  receive from the sender the video data for the certain viewing direction and/or the certain viewpoint.

In accordance with embodiments (see for example claim 3), the apparatus comprises
  a display device, e.g., a HMD, to display to a user the video data for the certain viewing direction and/or the certain viewpoint,
  a sensor to detect the viewing direction and/or the viewpoint of the user, and a processor to signal the detected viewing direction and/or the certain viewpoint to the sender and to process the received video data for display on the display device.

In accordance with embodiments (see for example claim 4), the apparatus is to receive from the sender for the certain viewing direction and/or the certain viewpoint of the video data representing the immersive content
  (i) first video data rendered by the sender and representing a 2D viewport version of video data representing the immersive content for the certain viewing direction and/or for the certain viewpoint, or
  (ii) second video data not rendered by the sender and representing at least a part of the immersive content to be transmitted by the sender.

In accordance with embodiments (see for example claim 5), during an immersive media session, the apparatus is to receive from the sender the first video data or the second video data dependent on a latency between the receiver and the sender.

In accordance with embodiments (see for example claim 6), the latency comprises one or more of:
  an end-to-end latency, the end-to-end latency comprising one or more of a network latency, a rendering latency, and a coding latency,
  a motion-to-photon, MTP, latency, the MTP latency being a time from a detection of a change in the certain viewing direction and/or in the certain viewpoint at the receiver until displaying the rendered video data for the new viewing direction and/or the new viewpoint, wherein the MTP latency may be reduced by a prediction look ahead time.

In accordance with embodiments (see for example claim 7),
  the apparatus is to receive from the sender the first video data, in case the latency is below or at a certain threshold, e.g., 15 ms to 20 ms, and
  the apparatus is to receive from the sender the second video data, in case the latency is above the certain threshold.

In accordance with embodiments (see for example claim 8),
  in case the sender provides the first video data representing the 2D viewport version in a first format and the second video data representing the non-rendered immersive content in a second format, the apparatus is to send to the sender a message, e.g., an RTCP message, requesting switching between the first and second formats, either immediately or at a certain time following the message, or
  in case the sender provides the first video data and the second video data using the same format and provides for dynamic switching from a first processing mode for providing the 2D viewport version to a second processing mode for providing the non-rendered part of the video data representing the immersive content, the apparatus is to send to the sender a message, e.g., an RTCP message, requesting switching between the first and second modes, either immediately or at a certain time following the message.

In accordance with embodiments (see for example claim 9), the certain threshold is one or more of:
  a network latency,
  an end-to-end latency,
  a maximum or an acceptable motion-to-photon, MTP latency,
  an MTP latency corresponding to a predefined Quality of Experience, QoE, MTP latency reduced by a prediction lookahead time indicative of a temporal capability of a predictor to look into the future.

In accordance with embodiments (see for example claim 10), at the beginning of an immersive media session, when the latency is still unknown, the apparatus is to accept only the second video data, until the latency is known or may be estimated reliably.

In accordance with embodiments (see for example claim 11),
- at the beginning of an immersive media session, the apparatus is to negotiate with the sender, and
- when negotiating with the sender, the apparatus is to receive from the sender, using for example the Session Description Protocol, SDP, one or more parameters of the video data representing the immersive content, e.g., Supplementary Enhancement Information, SEI, messages.

In accordance with embodiments (see for example claim 12),
- when negotiating with the sender, the apparatus is to receive from the sender further an indication that the video data or format is dynamically switchable between (i) the first video data, and (ii) the second video data, and
- during the immersive media session, the apparatus is to receive respective video data packets, like Real Time Transport Protocol, RTP, packets, wherein a video data packet may be marked, e.g., using an RTP header extension, so as to indicate a switching between the first video data and the second video data, the marked video data packet indicating
  - an immediate switching between the first video data and the second video data, or
  - a certain time until switching between the first video data and the second video data.

In accordance with embodiments (see for example claim 13), the apparatus comprises a predictor providing a viewport prediction and/or a viewpoint prediction, or the apparatus is to receive from the sender the viewport prediction and/or the viewpoint prediction, the viewport prediction indicating a change from the current viewing direction of the user to a new viewing direction of the user to happen after the lookahead time, and the viewpoint prediction indicating a change from the current viewpoint of the user to a new viewpoint of the user to happen after the lookahead time.

In accordance with embodiments (see for example claim 14), viewpoint changes are
- constrained, e.g., to multiple discrete viewpoints a user may access, or
- unconstrained, e.g., a user is allowed to fully navigate inside a virtual scene.

In accordance with embodiments (see for example claim 15), responsive to the viewport prediction and/or viewpoint prediction, the apparatus is to determine a specific viewport and/or viewpoint to be signaled, e.g., based on a prediction accuracy, the lookahead time and a Round Trip Time, RTT, and to signal the specific viewport and/or viewpoint to the sender using a feedback message, e.g., an RTCP feedback message.

In accordance with embodiments (see for example claim 16), at the beginning of an immersive media session, the apparatus is to negotiate with the sender a value of the certain threshold based on the prediction capabilities at the apparatus and/or the sender.

In accordance with embodiments (see for example claim 17), the prediction capabilities include a per-viewpoint prediction accuracy, wherein the per-viewpoint prediction accuracy may classify a viewpoint to be predicted harder than another viewpoint dependent on content characteristics of the viewpoints, like a number of salient areas which the user is most likely to view.

In accordance with embodiments (see for example claim 18),
- the apparatus is to signal, e.g., via SDP, to the sender an accuracy, e.g., in the form of a drift over time or an overlay of prediction and reality, and the lookahead time with which the apparatus performs the viewport prediction and/or viewpoint prediction, so as to allow the sender to decide whether the sender accepts the viewport prediction and/or viewpoint prediction from the apparatus and/or whether the sender performs the viewport prediction and/or the viewpoint prediction, and
- the apparatus is to receive, e.g., via SDP, from the sender a signaling indicating whether the viewport prediction and/or the viewpoint prediction is to be performed by the apparatus and/or by the sender.

In accordance with embodiments (see for example claim 19),
- the apparatus is to decide whether the sender or the apparatus performs the viewport prediction and/or the viewpoint prediction, and
- the apparatus is signal to the sender, e.g., via SDP, an indicating whether the viewport prediction and/or the viewpoint prediction is to be performed by the apparatus and/or by the sender.

In accordance with embodiments (see for example claim 20), during the immersive media session,
- in case the viewport prediction and/or viewpoint prediction is to be performed by the sender, the apparatus is to receive from the sender a request for certain parameters, e.g., viewing direction, viewpoint, reporting interval, speed or acceleration, required at the sender for performing the viewport prediction and/or the viewpoint prediction, and
- in case the viewport prediction and/or the viewpoint prediction is to be performed by the apparatus, the apparatus is to receive from the sender certain prediction information to be used by the apparatus about certain viewing directions and/or certain viewpoints, e.g., based on the sender's knowledge about content characteristics, e.g., picture domain saliency analysis, statistical analysis of user behavior, a-priori knowledge of script scenes.

In accordance with embodiments (see for example claim 21), in case a scene includes multiple viewpoints and the apparatus is to perform prediction, the apparatus is to analyze previous sensor data and determine whether it is more likely that a switch is to occur inside a current viewpoint or that the viewpoint will change.

In accordance with embodiments (see for example claim 22), the apparatus is to send, e.g., in a RTCP report, to the sender an error or drift indication that signals that the received video data for the certain viewing direction and/or the certain viewpoint does not match an actual viewing orientation and/or an actual viewpoint.

In accordance with embodiments (see for example claim 23), the apparatus is to signal a worst case drift or an average drift, wherein the average drift is signaled as the ratio of a predicted viewport or viewpoint and a real viewing orientation or viewpoint position over a certain time period, and the worst case drift is signaled as the maximum drift value attained over a certain time period.

In accordance with embodiments (see for example claim 24), in case the drift is in a specific direction, e.g., the predicted viewport and/or the predicted viewpoint corresponds to a smaller movement in the predicted direction, the apparatus is to signal the direction of the drift.

In accordance with embodiments (see for example claim 25), in case the apparatus processes the first video data and the average drift is over a certain threshold for a certain time period or the worst case drift exceeds a certain threshold, the apparatus is to decide to switch from first video data to the second video data.

In accordance with embodiments (see for example claim 26), the apparatus is to use Foveated Rendering, and to signal respective parameters used in the Foveated Rendering algorithm to the sender, so as to allow the sender to provide a content matching the operation mode of the foveated rendering.

In accordance with embodiments (see for example claim 27), the parameters used in the Foveated Rendering algorithm comprise:
  a downgrading function used as a parameterized function of the quality based on a distance to the center of the viewing direction, or
  regions or distance thresholds that lead to downgrading of the quality for the content, or
  a temporal distribution of an eye motion area averaged over a time period, e.g. 95% of the time the viewing direction is gazing at an area covering 80% of the viewport, so as to allow the sender to adapt the transmission, e.g., encode outer parts, which are usually not gazed at by the user, with a lower pixel density.

Sender/Server for Immersive Media Presentation

The present invention provides (see for example claim 28) an apparatus for providing immersive media content to a receiver, wherein
  the apparatus is to
  receive from the receiver an indication of a certain viewing direction and/or a certain viewpoint for displaying the immersive content at the receiver, and
  transmit to the receiver video data representing the immersive content for the certain viewing direction and/or for the certain viewpoint.

In accordance with embodiments (see for example claim 29), the apparatus is to provide
  (i) first video data representing a 2D viewport version of the certain viewing direction and/or the certain viewpoint of the video data representing the immersive content, or
  (ii) second video data representing at least a part of the immersive content to be transmitted,
  wherein, in case the first video data is to be provided, render the video data, encode the rendered video data and transmit the encoded video data to the receiver, and
  wherein, in case the second video data is to be provided, encode the video data, without rendering, encode one or more messages describing parameters of the immersive content, e.g., Supplementary Enhancement Information, SEI, messages, and transmit the encoded video data and the encoded one or more messages to the receiver.

In accordance with embodiments (see for example claim 30), the apparatus is to provide to the receiver the first video data or the second video data dependent on an latency between the receiver and the sender.

In accordance with embodiments (see for example claim 31),
  in case the apparatus provides the first video data and the second video data using the same format and provides for dynamic switching from a first processing mode for providing the 2D viewport version to a second processing mode for providing the non-rendered the video data representing the immersive content, the apparatus is to
  receive from the receiver a request message, e.g., an RTCP message, for switching between the first and second modes, either immediately or at a certain time following the message, and
  responsive to the request, switch the processing mode for the video and provide to the receiver video processed according to the new mode, and
  in case the apparatus provides the first video data representing the 2D viewport version in a first format and the second video data representing the non-rendered part of the immersive content in a second format, the apparatus is to
  receive from the receiver a request message, e.g., an RTCP message, for switching between the first and second formats, either immediately or at a certain time following the message, and
  responsive to the request, send to the receiver video using the first format or the second format.

In accordance with embodiments (see for example claim 32), the latency comprises one or more of:
  an end-to-end latency, the end-to-end latency comprising one or more of a network latency, a rendering latency, and a coding latency,
  a motion-to-photon, MTP, latency, the MTP latency being a time from a detection of a change in the certain viewing direction and/or in the certain viewpoint at the receiver until displaying the rendered video data for the new viewing direction and/or the new viewpoint, wherein the MTP latency may be reduced by a prediction look ahead time.

In accordance with embodiments (see for example claim 33),
  the apparatus is to provide to the receiver the first video data, in case the latency is below or at a certain threshold, e.g., 15 ms to 20 ms, and
  the apparatus is to provide to the receiver the second video data, in case the latency is above the certain threshold.

In accordance with embodiments (see for example claim 34), the certain threshold is one or more of:
  a network latency,
  an end-to-end latency,
  a maximum or an acceptable motion-to-photon, MTP latency,
  an MTP latency corresponding to a predefined Quality of Experience, QoE,
  MTP latency reduced by a prediction lookahead time indicative of a temporal capability of a predictor to look into the future.

In accordance with embodiments (see for example claim 35), at the beginning of an immersive media session, when the latency is still unknown, the apparatus is to provide only the second video data, until the latency is known or may be estimated reliably.

In accordance with embodiments (see for example claim 36),
  at the beginning of an immersive media session, the apparatus is to negotiate with the receiver, and
  when negotiating with the receiver, the apparatus is to send to the receiver, using for example the Session Description Protocol, SDP, one or more parameters of the immersive content, e.g., Supplementary Enhancement Information, SEI, messages.

In accordance with embodiments (see for example claim 37),
the one or more SDP messages of the sender further include an indication that the video data or format is dynamically switchable between (i) the first video data, and (ii) the second video data, and
during the immersive media session, the apparatus is to send respective video data packets, like Real Time Transport Protocol, RTP, packets, wherein a video data packet may be marked, e.g., using an RTP header extension, so as to indicate a switching between the first video data and the second video data, the marked video data packet indicating
an immediate switching between the first video data and the second video data, or
a certain time until switching between the first video data and the second video data.

In accordance with embodiments (see for example claim 38), the apparatus comprises a predictor providing a viewport prediction and/or a viewpoint prediction, or the apparatus is to receive from the receiver the viewport prediction and/or the viewpoint prediction, the viewport prediction and/or the viewpoint prediction indicating a change from the current viewing direction and/or viewpoint of the user of the receiver to a new viewing direction and/or viewpoint of the user to happen after the lookahead time.

In accordance with embodiments (see for example claim 39), viewpoint changes are
constrained, e.g., to multiple discrete viewpoints a user may access, or
unconstrained, e.g., a user is allowed to fully navigate inside a virtual scene.

In accordance with embodiments (see for example claim 40), responsive to the viewport prediction and/or the viewpoint prediction, the apparatus is to determine a specific viewport and/or viewpoint to be provided, e.g., based on a prediction accuracy, the look-ahead time and a Round Trip Time, RTT.

In accordance with embodiments (see for example claim 41), at the beginning of an immersive media session, the apparatus is to negotiate with the receiver a value of the certain threshold based on the prediction capabilities at the apparatus and/or the sender.

In accordance with embodiments (see for example claim 42), the prediction capabilities include a per-viewpoint prediction accuracy, wherein the per-viewpoint prediction accuracy may classify a viewpoint to be predicted harder than another viewpoint dependent on content characteristics of the viewpoints, like a number of salient areas which the user is most likely to view.

In accordance with embodiments (see for example claim 43), the apparatus is to
receive, e.g., via SDP, from the receiver an accuracy, e.g., in the form of a drift over time or an overlay of prediction and reality, and the lookahead time with which the receiver performs the viewport prediction and/or the viewpoint prediction,
decide whether the apparatus accepts the viewport prediction and/or the viewpoint prediction from the receiver or whether the apparatus performs the viewport prediction and/or the viewpoint prediction, and
signal to the receiver, e.g., via SDP, whether the viewport prediction and/or the viewpoint prediction is to be performed by the apparatus and/or the receiver.

In accordance with embodiments (see for example claim 44),
in case the viewport prediction and/or the viewpoint prediction is to be performed by the apparatus, the apparatus is to receive from the receiver certain parameters, e.g., viewing direction, viewpoint, reporting interval, speed or acceleration, required at the sender for performing the viewport prediction and/or the viewpoint prediction, and
in case the viewport prediction and/or the viewpoint prediction is to be performed by the receiver, the apparatus is to send to the receiver certain prediction information to be used by the apparatus about certain viewing directions and/or viewpoint, e.g., based on the sender's knowledge about content characteristics, e.g., picture domain saliency analysis, statistical analysis of user behavior, a-priori knowledge of script scenes.

In accordance with embodiments (see for example claim 45), in case a scene includes multiple viewpoints and the sender is to perform prediction, the apparatus is to receive a feedback from the receiver about the current viewing direction and position inside the scene, and to combine the feedback with statistics of other users or content information, e.g. at which spatial area of a certain viewport the users are more likely to change their viewpoints, for determining whether it is more likely that a switch is to occur inside a current viewpoint or that the viewpoint will change.

In accordance with embodiments (see for example claim 46),
the apparatus is to receive, e.g., in a RTCP report, from the receiver an error or drift indication that signals that the received video data for the certain viewing direction and/or the certain viewpoint does not match an actual viewing orientation and/or an actual viewpoint at the apparatus, and
responsive to the error or drift, the apparatus is to adapt, e.g., a margin or prefetch used.

In accordance with embodiments (see for example claim 47), the apparatus is to receive a worst case drift or an average drift, wherein the average drift is signaled as the ratio of a predicted viewport or viewpoint and a real viewing orientation or viewpoint position over a certain time period, and the worst case drift is signaled as the maximum drift value attained over a certain time period.

In accordance with embodiments (see for example claim 48), in case the drift is in a specific direction, e.g., the predicted viewport and/or the predicted viewpoint corresponds to a smaller movement in the predicted direction, the apparatus is to receive the direction of the drift and to adapt its prediction, e.g., by adding a prefetch in the direction of the mismatched prediction.

In accordance with embodiments (see for example claim 49), the receiver uses Foveated Rendering, and the apparatus is to receive respective parameters used in the Foveated Rendering algorithm from the receiver, and provide a content matching the operation mode of the foveated rendering.

Receiver/Client and Sender/Server for Immersive Media Presentation

In accordance with embodiments (see for example claim 50), the immersive content includes one or more of:
3DoF, three Degrees of Freedom, content, e.g. one or more 360° videos,
6DoF, six Degrees of Freedom, content, e.g. captured volumetric objects, like real objects, or volumetric videos of, e.g., real objects,
3D objects generated, e.g., using computer graphics, like Computer-Generated Imagery, CGI.

In accordance with embodiments (see for example claim 51), the immersive content to be transmitted by the sender or received by the receiver includes one or more of:
- in case of a 360° video or a 360° graphic, a projected video transmission, e.g., a part of the full 360° video transmitted using a particular projection,
- in case of a volumetric object or a volumetric video, a 3D data transmission for the full volumetric object or for a part of the volumetric object in a certain 3D format, e.g., as a point cloud or as a mesh,
- in case of 3D computer graphics, e.g., games, a complete scene, e.g., multiple volumetric objects, in a certain 3D format such as multiple point clouds or meshes.

In accordance with embodiments (see for example claim 52), the immersive content is to be identified by
- a certain Supplementary Enhancement Information, SEI, parameter, e.g., the sprop-sei parameter,
- an indication of a particular video codec or profile, or
- by an additional attribute in the Session Description Protocol, SDP, e.g., "videoformat 3DoF" or "videoformat 6DoF" or "videoformat Volumetric".

In accordance with embodiments (see for example claim 53), in case the immersive content represents a volumetric scene including one or more volumetric objects, the immersive content includes a plurality of bitstreams for describing respective properties of the volumetric object, e.g., at least a texture bit stream and a geometry bitstream, or a compressed mesh bit stream and a texture bitstream.

In accordance with embodiments (see for example claim 54), the use of the different bitstreams is signaled using, e.g., the SDP, wherein the SDP may contain information about the different kind of bitstreams and possible variants of the bitstreams.

In accordance with embodiments (see for example claim 55), the plurality of bitstreams describing respective properties of a volumetric object are associated with each other using, e.g., the grouping mechanisms of the SDP.

System for Immersive Media Presentation

The present invention provides (see for example claim 56) a system, comprising a sender including an apparatus in accordance with any one of the embodiments of the present invention, and a receiver including an apparatus in accordance with any one of the embodiments of the present invention.

Method for Immersive Media Presentation

The present invention provides (see for example claim 57) a method for presenting immersive media content, the method comprising:
- obtaining, by a receiver, from a sender video data representing immersive content for a certain viewing direction and/or for a certain viewpoint, and
- displaying, at the receiver, the video data representing the immersive content for the certain viewing direction and/or for the certain viewpoint.

The present invention provides (see for example claim 58) a method for providing immersive media content, the method comprising:
- receiving, at a sender, an indication of a certain viewing direction and/or a certain viewpoint for displaying the immersive content at the receiver, and
- transmitting, by the sender, to the receiver video data representing the immersive content for the certain viewing direction and/or for the certain viewpoint.

In accordance with embodiments (see for example claim 59), the receiver includes an apparatus in accordance with any one of the embodiments of the present invention and/or the sender includes an apparatus in accordance with any one of the embodiments of the present invention.

Receiver/Client for 360° Video Communication

The present invention provides (see for example claim 61) an apparatus for a 360° video communication with a sender, wherein
the apparatus is to obtain from the sender video data dependent on a certain viewing direction of a 360° video, and display the video data representing the certain viewing direction of the 360° video.

In accordance with embodiments (see for example claim 62), to obtain the video data from the sender, the apparatus is to signal to the sender the certain viewing direction of the 360° video, and receive from the sender the video data for the certain viewing direction of the 360° video.

In accordance with embodiments (see for example claim 63), the apparatus comprises a display device, e.g., a HMD, to display to a user the video data for the certain viewing direction of the 360° video, a sensor to detect the viewing direction of the user, and a processor to signal the detected viewing direction to the sender and to process the received video data for display on the display device.

In accordance with embodiments (see for example claim 64), the apparatus is to request from the sender for the certain viewing direction of the 360° video (i) first video data rendered by the sender and representing a 2D viewport version of the certain viewing direction of the 360° video or (ii) second video data not rendered by the sender and representing at least a part of the 360° video to be transmitted by the sender using a certain projection.

In accordance with embodiments (see for example claim 65), during the session of the 360° video communication, the apparatus is to request from the sender the first video data or the second video data dependent on an end-to-end latency between the receiver and the sender.

In accordance with embodiments (see for example claim 66), the end-to-end latency is a time from a detection of a change in the certain viewing direction at the receiver until displaying the rendered video data for the new viewing direction.

In accordance with embodiments (see for example claim 77), the apparatus is to request from the sender the first video data, in case the end-to-end latency is below or at a certain threshold, e.g., 15 ms to 20 ms, and the apparatus is to request from the sender the second video data, in case the end-to-end latency is above the certain threshold.

In accordance with embodiments (see for example claim 88), in case the sender provides the first video data representing the 2D viewport version in a first format and the second video data representing the non-rendered part of the 360° video in a second format, the apparatus is to send to the sender a message, e.g., an RTCP message, requesting switching between the first and second formats, either immediately or at a certain time following the message, or, in case the sender provides the first video data and the second video data using the same format and provides for dynamic switching from a first processing mode for providing the 2D viewport version to a second processing mode for providing the non-rendered part of the 360° video, the apparatus is to send to the sender a message, e.g., an RTCP message, requesting switching between the first and second modes, either immediately or at a certain time following the message.

In accordance with embodiments (see for example claim 69), the certain threshold is a maximum or acceptable motion-to-photon, MTP, latency yielding, e.g., a predefined Quality of Experience, QoE, or the MTP latency plus a prediction lookahead time indicative of a temporal capability of a predictor to look into the future.

In accordance with embodiments (see for example claim 70), at the beginning of a session of the 360° video communication, when the end-to-end latency is still unknown, the apparatus is to accept only the second video data, until the end-to-end latency is known or may be estimated reliably.

In accordance with embodiments (see for example claim 71), at the beginning of a session of the 360° video communication, the apparatus is to negotiate with the sender, and, when negotiating with the sender, the apparatus is to receive from the sender, using for example the Session Description Protocol, SDP, one or more parameters of the 360° video, e.g., Supplementary Enhancement Information, SEI, messages indicating one or more of a projection type, a rotation and region-wise packing, RWP, constraints.

In accordance with embodiments (see for example claim 72), when negotiating with the sender, using for example the SDP, the apparatus is to include one or more additional parameters of the 360° video according to the capabilities of the apparatus, and/or modify or remove, according to the capabilities of the apparatus, one or more of the parameters of the 360° video,
 transmit to the sender the parameters of the 360° video so as to allow the sender to encode the projected video according to the transmitted.

In accordance with embodiments (see for example claim 73), the one or more of the parameters of the 360° video comprise Region-Wise Packing, RWP, parameters, and the apparatus is to include one or more new elements into the SDP message so as to constrain RWP formats to the capabilities of the apparatus, wherein the RWP formats may indicate, for example, one or more of the following constraints:
 rwp-max-num-packed-regions indicating a maximum number of packed regions,
 rwp-min-proj-region-width/height indicating a minimum width/height of a projected region,
 rwp-min-packed-region-width/height indicating a minimum width/height of a packed region,
 rwp-allowed-transform-types indicating allowed transform types,
 rwp-guard-band-flag-constraint indicating a guard band around a packed region,
 rwp-max-scaling-factor indicating a maximum scaling factor for a packed region.

In accordance with embodiments (see for example claim 74), when negotiating with the sender, the apparatus is to receive from the sender further an indication that the video data or format is dynamically switchable between (i) the first video data, and (ii) the second video data, and, during the session of the 360° video communication, the apparatus is to receive respective video data packets, like Real Time Transport Protocol, RTP, packets, wherein a video data packet may be marked, e.g., using an RTP header extension, so as to indicate a switching between the first video data and the second video data, the marked video data packet indicating an immediate switching between the first video data and the second video data, or a certain time until switching between the first video data and the second video data.

In accordance with embodiments (see for example claim 75), the apparatus comprises a viewport predictor providing a viewport prediction, or the apparatus is to receive from the sender the viewport prediction, the viewport prediction indicating a change from the current viewing direction of the user to a new viewing direction of the user to happen after the lookahead time.

In accordance with embodiments (see for example claim 76), responsive to the viewport prediction, the apparatus is to determine a specific viewport to be requested, e.g., based on a prediction accuracy, the lookahead time and a Round Trip Time, RTT, and to signal the specific viewport to the sender using a feedback message, e.g., an RTCP feedback message.

In accordance with embodiments (see for example claim 77), at the beginning of a session of the 360° video communication, the apparatus is to negotiate with the sender a value of the certain threshold based on the prediction capabilities at the apparatus and/or the sender.

In accordance with embodiments (see for example claim 78), the apparatus is to signal, e.g., via SDP, to the sender an accuracy, e.g., in the form of a drift over time or an overlay of prediction and reality, and the lookahead time with which the apparatus performs the viewport prediction, so as to allow the sender to decide whether the sender accepts the viewport prediction from the apparatus or whether the sender performs the viewport prediction, and the apparatus is to receive, e.g., via SDP, from the sender a signaling indicating whether the viewport prediction is to be performed by the apparatus or by the sender.

In accordance with embodiments (see for example claim 79), the apparatus is to decide whether the sender or the apparatus performs the viewport prediction, and the apparatus is signal to the sender, e.g., via SDP, an indicating whether the viewport prediction is to be performed by the apparatus or by the sender.

In accordance with embodiments (see for example claim 80), during the session of the 360° video communication, in case the viewport prediction is to be performed by the sender, the apparatus is to receive from the sender a request for certain parameters, e.g., viewing direction, reporting interval, speed or acceleration, required at the sender for performing the viewport prediction, and in case the viewport prediction is to be performed by the apparatus, the apparatus is to receive from the sender certain prediction information to be used by the apparatus about certain viewing directions or certain regions, e.g., based on the sender's knowledge about content characteristics, e.g., picture domain saliency analysis, statistical analysis of user behavior, a-priori knowledge of script scenes.

In accordance with embodiments (see for example claim 81), the video data matches the viewport size exactly, thereby matching the field of view, FoV, of the display device, or the video data includes a margin area around the viewport, the margin area being a certain percentage of the viewport.

In accordance with embodiments (see for example claim 82), during of a session of the 360° video communication, if the viewport size includes the margin, the apparatus is to receive an indication of a lens/distortion parameter used for rendering to assist the apparatus in cropping/warping the viewport.

In accordance with embodiments (see for example claim 83), at the beginning of a session of the 360° video communication, the apparatus is to negotiate with the sender the dimension and/or the margin area of the video data.

In accordance with embodiments (see for example claim 84), the apparatus is to send, e.g., in a RTCP report, to the sender an error or drift indication that signals that the received video data for the certain viewing direction does not match an actual viewing orientation at the apparatus.

In accordance with embodiments (see for example claim 85), the apparatus is to signal a worst case drift or an average drift, wherein the average drift is signaled as the ratio of a predicted viewport and a real viewing orientation over a certain time period, and the worst case drift is signaled as the maximum drift value attained over a certain time period.

In accordance with embodiments (see for example claim 86), in case the drift is in a specific direction, e.g., the predicted viewport corresponds to a smaller movement in the predicted direction, the apparatus is to signal the direction of the drift.

In accordance with embodiments (see for example claim 87), in case the apparatus processes the first video data and the average drift is over a certain threshold for a certain time period or the worst case drift exceeds a certain threshold, the apparatus is to decide to switch from first video data to the second video data.

In accordance with embodiments (see for example claim 88), the apparatus is to use Foveated Rendering, and to signal respective parameters used in the Foveated Rendering algorithm to the sender, so as to allow the sender to provide a content matching the operation mode of the foveated rendering.

In accordance with embodiments (see for example claim 89), the parameters used in the Foveated Rendering algorithm comprise a downgrading function used as a parameterized function of the quality based on a distance to the center of the viewing direction, or regions or distance thresholds that lead to downgrading of the quality for the content, or a temporal distribution of an eye motion area averaged over a time period, e.g. 95% of the time the viewing direction is gazing at an area covering 80% of the viewport, so as to allow the sender to adapt the transmission, e.g., encode outer parts, which are usually not gazed at by the user, with a lower pixel density.

Sender/Server for 360° Video Communication

The present invention provides (see for example claim 90) an apparatus for a 360° video communication with a receiver, wherein the apparatus is to receive from the receiver an indication of a certain viewing direction of a 360° video at the receiver, and transmit video data for the certain viewing direction of a 360° video to the receiver.

In accordance with embodiments (see for example claim 91), the apparatus is to provide (i) first video data representing a 2D viewport version of the certain viewing direction of the 360° video or (ii) second video data representing at least a part of the 360° video to be transmitted using a certain projection, in case the first video data is to be provided, render the video data, encode the rendered video data and transmit the encoded video data to the receiver, and in case the second video data is to be provided, encode the video data using a certain projection, without rendering, encode one or more messages describing parameters of the 360° video, e.g., Supplementary Enhancement Information, SEI, messages indicating a projection type, a rotation and region-wise packing, RWP, constraints, and transmit the encoded video data and the encoded one or more messages to the receiver.

In accordance with embodiments (see for example claim 92), the apparatus is to provide to the receiver the first video data or the second video data dependent on an end-to-end latency between the receiver and the sender.

In accordance with embodiments (see for example claim 93), in case the apparatus provides the first video data and the second video data using the same format and provides for dynamic switching from a first processing mode for providing the 2D viewport version to a second processing mode for providing the non-rendered part of the 360° video, the apparatus is to receive from the receiver a request message, e.g., an RTCP message, for switching between the first and second modes, either immediately or at a certain time following the message, and responsive to the request, switch the processing mode for the video and provide to the receiver video processed according to the new mode, and in case the apparatus provides the first video data representing the 2D viewport version in a first format and the second video data representing the non-rendered part of the 360° video in a second format, the apparatus is to receive from the receiver a request message, e.g., an RTCP message, for switching between the first and second formats, either immediately or at a certain time following the message, and responsive to the request, send to the receiver video using the first format or the second format.

In accordance with embodiments (see for example claim 94), the end-to-end latency is a time from a detection of a change in the certain viewing direction at the receiver until displaying the rendered video data for the new viewing direction.

In accordance with embodiments (see for example claim 95), the apparatus is to provide to the receiver the first video data, in case the end-to-end latency is below or at a certain threshold, e.g., 15 ms to 20 ms, and the apparatus is to provide to the receiver the second video data, in case the end-to-end latency is above the certain threshold.

In accordance with embodiments (see for example claim 96), the certain threshold is a maximum or acceptable motion-to-photon, MTP, latency yielding, e.g., a predefined Quality of Experience, QoE, or the MTP latency plus a prediction lookahead time indicative of a temporal capability of a predictor to look into the future.

In accordance with embodiments (see for example claim 97), at the beginning of a session of the 360° video communication, when the end-to-end latency is still unknown, the apparatus is to provide only the second video data, until the end-to-end latency is known or may be estimated reliably.

In accordance with embodiments (see for example claim 98), at the beginning of a session of the 360° video communication, the apparatus is to negotiate with the receiver, and when negotiating with the receiver, the apparatus is to send to the receiver, using for example the Session Description Protocol, SDP, one or more parameters of the 360° video, e.g., Supplementary Enhancement Information, SEI, messages indicating one or more of a projection type, a rotation and region-wise packing, RWP, constraints.

In accordance with embodiments (see for example claim 99), when negotiating with the receiver, using for example the SDP, the apparatus is to receive from the receiver one or more additional parameters of the 360° video according to the capabilities of the receiver, and/or one or more parameters of the 360° modified or reduced in number, according to the capabilities of the receiver, and schedule encoding the projected video according to the received parameters.

In accordance with embodiments (see for example claim 100), the one or more of the parameters of the 360° video comprise Region-Wise Packing, RWP, parameters, and the apparatus is to include one or more new elements into the SDP message so as to constrain RWP formats to the capabilities of the apparatus, wherein the RWP formats may indicate, for example, one or more of the following constraints:

rwp-max-num-packed-regions indicating a maximum number of packed regions, rwp-min-proj-region-width/height indicating a minimum width/height of a projected region, rwp-min-packed-region-width/height indicating a minimum width/height of a packed region, rwp-allowed-transform-types indicating allowed transform types, rwp-guard-band-flag-constraint indicating a guard band around a packed region, rwp-max-scaling-factor indicating a maximum scaling factor for a packed region.

In accordance with embodiments (see for example claim 101), the one or more SDP messages of the sender further include an indication that the video data or format is dynamically switchable between (i) the first video data, and (ii) the second video data, and during the session of the 360° video communication, the apparatus is to send respective video data packets, like Real Time Transport Protocol, RTP, packets, wherein a video data packet may be marked, e.g., using an RTP header extension, so as to indicate a switching between the first video data and the second video data, the marked video data packet indicating an immediate switching between the first video data and the second video data, or a certain time until switching between the first video data and the second video data.

In accordance with embodiments (see for example claim 102), the apparatus comprises a viewport predictor providing a viewport prediction, or the apparatus is to receive from the receiver the viewport prediction, the viewport prediction indicating a change from the current viewing direction of the user of the receiver to a new viewing direction of the user to happen after the lookahead time.

In accordance with embodiments (see for example claim 103), responsive to the viewport prediction, the apparatus is to determine a specific viewport to be provided, e.g., based on a prediction accuracy, the look-ahead time and a Round Trip Time, RTT.

In accordance with embodiments (see for example claim 104), at the beginning of a session of the 360° video communication, the apparatus is to negotiate with the receiver a value of the certain threshold based on the prediction capabilities at the apparatus and/or the sender.

In accordance with embodiments (see for example claim 105), the apparatus is to receive, e.g., via SDP, from the receiver an accuracy, e.g., in the form of a drift over time or an overlay of prediction and reality, and the lookahead time with which the receiver performs the viewport prediction, decide whether the apparatus accepts the viewport prediction from the receiver or whether the apparatus performs the viewport prediction, and signal to the receiver, e.g., via SDP, whether the viewport prediction is to be performed by the apparatus or the receiver.

In accordance with embodiments (see for example claim 106), in case the viewport prediction is to be performed by the apparatus, the apparatus is to receive from the receiver certain parameters, e.g., viewing direction, reporting interval, speed or acceleration, required at the sender for performing the viewport prediction, and, in case the viewport prediction is to be performed by the receiver, the apparatus is to send to the receiver certain prediction information to be used by the apparatus about certain viewing directions or certain regions, e.g., based on the sender's knowledge about content characteristics, e.g., picture domain saliency analysis, statistical analysis of user behavior, a-priori knowledge of script scenes.

In accordance with embodiments (see for example claim 107), the first video data matches the viewport size exactly, thereby matching the field of view, FoV, of the display device, or the first video data includes a margin area around the viewport, the margin area being a certain percentage of the viewport.

In accordance with embodiments (see for example claim 108), during of a session of the 360° video communication, if the viewport size includes the margin, the apparatus is to send to the receiver an indication of a lens/distortion parameter used for rendering to assist the receiver in cropping/warping the viewport.

In accordance with embodiments (see for example claim 109), the apparatus is to negotiate with the receiver the dimension and/or the margin area of the first video data.

In accordance with embodiments (see for example claim 110), the apparatus is to receive, e.g., in a RTCP report, from the receiver an error or drift indication that signals that the received video data for the certain viewing direction does not match an actual viewing orientation at the apparatus, and responsive to the error or drift, the apparatus is to adapt, e.g., a margin or prefetch used, or to change the viewing orientation specific projection, e.g., to have a bigger or smaller high-quality content coverage.

In accordance with embodiments (see for example claim 111), the apparatus is to receive a worst case drift or an average drift, wherein the average drift is signaled as the ratio of a predicted viewport and a real viewing orientation over a certain time period, and the worst case drift is signaled as the maximum drift value attained over a certain time period.

In accordance with embodiments (see for example claim 112), in case the drift is in a specific direction, e.g., the predicted viewport corresponds to a smaller movement in the predicted direction, the apparatus is to receive the direction of the drift and to adapt its prediction, e.g., by adding a prefetch in the direction of the mismatched prediction.

In accordance with embodiments (see for example claim 113), the receiver uses Foveated Rendering, and the apparatus is to receive respective parameters used in the Foveated Rendering algorithm from the receiver, and provide a content matching the operation mode of the foveated rendering.

System for 360° Video Communication

The present invention provides (see for example claim 114) a 360° video communication system, comprising a sender including an apparatus in accordance with any one of the embodiments of the present invention, and a receiver including an apparatus in accordance with any one of the embodiments of the present invention.

Method for 360° Video Communication

The present invention provides (see for example claim 115) a method for a 360° video communication, the method comprising obtaining, by a receiver, video data from a sender dependent on a certain viewing direction of a 360° video at the receiver, and displaying, at the receiver the video data representing the certain viewing direction of the 360° video.

The present invention provides (see for example claim 116) a method for a 360° video communication, the method comprising receiving, at a sender, an indication from a receiver of a certain viewing direction of a 360° video at the receiver, and transmitting, by the sender, video data for the certain viewing direction of a 360° video to the receiver.

In accordance with embodiments (see for example claim 117), the receiver includes an apparatus in accordance with any one of the embodiments of the present invention and/or the sender includes an apparatus in accordance with any one of the embodiments of the present invention.

Computer Program Product

The present invention provides a computer program product comprising instructions which, when the program is executed by a computer, cause the computer to carry out the one or more methods in accordance with the present invention.

Figure 3:
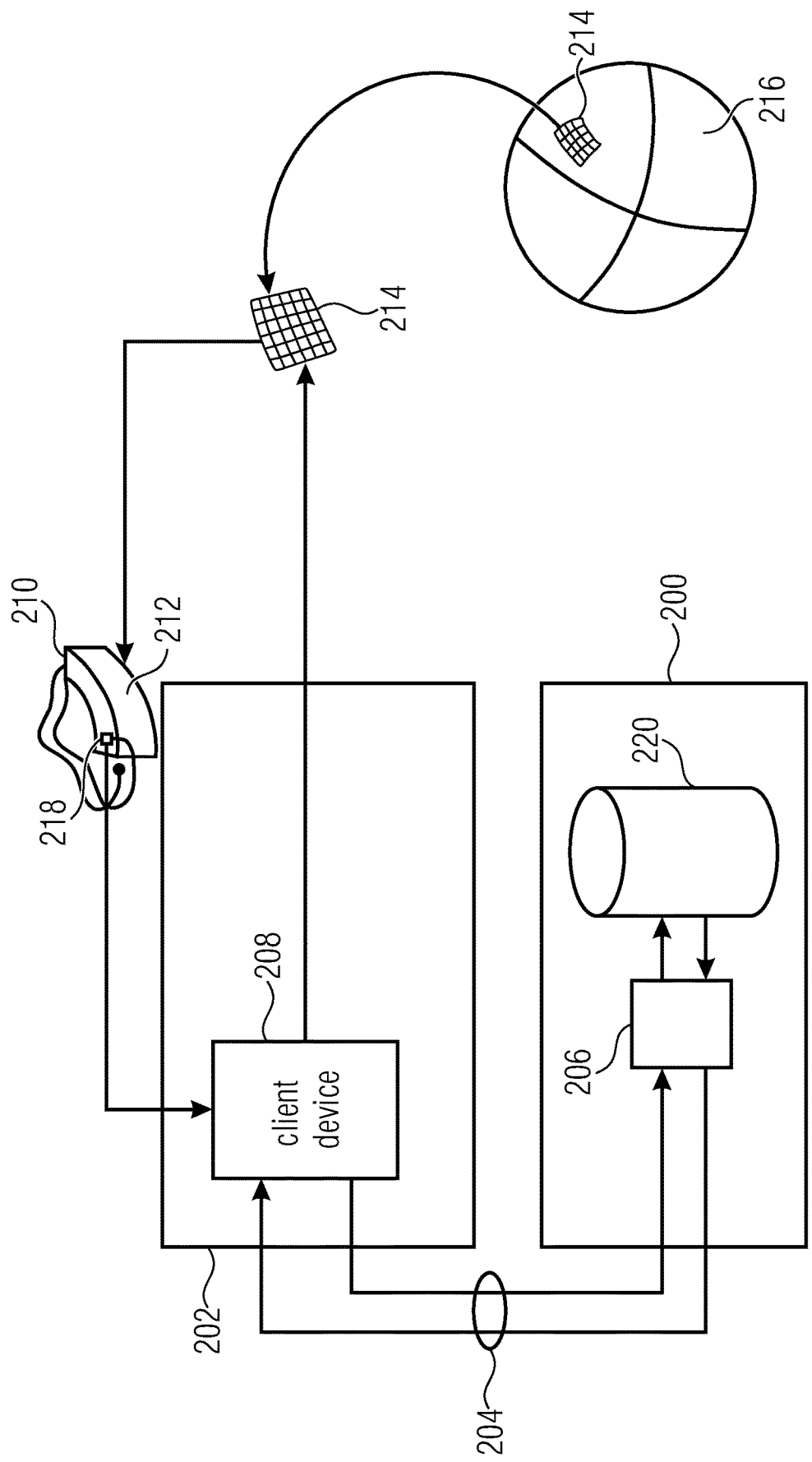
FIG. 3 illustrates an example of an environment, similar to FIG. 2, in which embodiments of the present invention may be applied and advantageously used.

More detailed embodiments of the inventive approach are now be described. FIG. 3 shows an example of an environment, similar to FIG. 2, in which embodiments of the present invention may be applied and advantageously used. FIG. 3 shows a system including the server 200 and the client 202 set up for an efficient immersive media communication or immersive media content presentation or for a 360° video communication for a virtual reality application. The system presents to a user wearing a head-up display 210, for example, using an internal display 212 of the head-up display 204, a view selection 214 of a temporarily-varying spatial scene 216 of the 360° video corresponding to a certain viewing direction. The view selection or the viewing direction 214 may correspond to an orientation of the head-up display 210 that may be measured by an internal orientation sensor 218. Thus, the selection 214 presented to the user is a selection of the spatial scene 216, and the spatial position of the spatial scene 216 corresponds to the orientation of the head-up display 210. The temporarily-varying spatial scene 216 includes immersive media content or is a 360° video, also referred to as an omnidirectional video or a spherical video. The present invention is not limited to head-up displays, rather, in accordance with other embodiments, the selection 214 may be displayed to a user on another display device, like a regular monitor or the like. The sensor 218 and the display 210 may be separate or different devices, such as a remote control and a corresponding television set. In accordance with other embodiments, the sensor 218 and the display 212 may be part of a hand-held device, like a mobile device, such as a tablet or a mobile phone.

The server 200 may comprise a controller 206, for example, implemented using the signal processor 206 of FIG. 2, and a storage 220. The controller 206 may be an appropriately programed computer, an application-specific integrated circuit or the like. The storage 202 may store media segments which represent the spatial scene 216. The controller 206, responsive to requests from the client 202, may send to the client 202 media segments, for example requested video/audio data, together with respective control information. The controller 206 may fetch the requested media segments from the storage 220 and, in accordance with embodiments, may provide the video data towards the client 202 either as a rendered version of the view section 214 also referred to as a rendered viewport, or may provide to the client 202 the video data as projected data, i.e., without any rendering.

The client 202 may include a client device or controller 208, for example, implemented using the signal processor 208 of FIG. 2, and may be an appropriately programed computer, a microprocessor, a programed hardware device and the like. The client device 208 may select the media segments to be retrieved from the server 200 together with respective control information. In accordance with embodiments described in more detail below, dependent on whether the video data forwarded to the client 202 is rendered video data or projected video data, the client 202, in case of receiving rendered video data, uses the rendered video data as is for display on the device 210. In case the received data is projected video, the controller 208 is provided so as to perform rendering the viewport on the basis of the received projected video data for display on the device 210.

The transmission of the data within the media stream 204 is performed in encoded form so that the respective entities in the server 200 and the client 202, for example the controllers 206 and 208, include respective encoders/decoders.

In the following, the embodiments of the present invention are described in more detail with reference to an environment as described with reference to FIG. 2 and FIG. 3.

Embodiments of the present invention concern the presentation of immersive media content during which the server and client, also referred to as the sender and receiver or recipient, interact, and the sender provides video data, e.g., the bitstream including video data that matches a viewing direction and/or a viewpoint of the receiver end point based on a feedback provided by the receiver. When considering, e.g., the systems of FIG. 2 or FIG. 3, the receiver or client 202 is capable to obtain from the server or sender 200 video data representing the immersive media content on the viewing direction and/or the viewpoint at the client. In other words, for a presentation of immersive media content, the client 202 obtains from the server video data dependent on a certain viewing direction and/or a certain viewpoint, and displays the video data representing the certain viewing direction of the immersive media content.

In accordance with embodiments, the client 202, for obtaining the video data from the server 200, may signal to the server 200—see the double-headed arrow in FIG. 2 or the connection from the client device 208 of the client 202 to the controller 206 of the server 200 in FIG. 3—the certain viewing direction and/or the certain viewpoint, and receive from the server 200 the video data for the certain viewing direction and/or the certain viewpoint.

In accordance with further embodiments, the client includes, as is depicted in FIG. 3, the display device 210, e.g., a HMD, to display to a user the video data for the certain viewing direction 214 and/or the certain viewpoint of the media. The client further includes one or more sensors 218 to detect the viewing direction and/or the viewpoint of the user, and the client device or processor 208 signals the detected viewing direction and/or the detected viewpoint to the server and processes the received video data associated with the signaled viewing direction and/or viewpoint for display on the display device 210.

For the presentation of immersive media content by the client 202, the server 200 receives from the client 202 an indication of a certain viewing direction and/or a certain viewpoint at the client 202, and transmits video data for the certain viewing direction 214 and/or the certain viewpoint to the client 202.

The above described embodiments are advantageous in that the video data for a particular viewing direction and/or a particular viewpoint of a scene are transmitted—responsive to the actual viewing direction and/or the actual viewpoint at the client—so that less video data needs to be transmitted and/or processed when compared to conventional approaches. Thus, delays causing a decrease in the real time experience or, more general, in the Quality of Experience, QoE, of a user may be reduced or avoided.

Further embodiments of the present invention define mechanisms and a signaling that allow for an improved and more efficient presentation of immersive media content by extending the above-described protocols, e.g., the RTP, RTCP and SDP protocols. According to embodiments, extension mechanisms for RTP and RTCP packets as well as new attributes for SDP are defined so as to achieve the inventive approach of providing improved and more efficient mechanisms and signaling for the presentation of immersive media content.

Embodiments of the present invention provide for an immersive media session different media formats or processing modes for the video data, namely rendered video data and the non-rendered video data representing the immersive media content, and for switching between the rendered video data and the non-rendered data dependent on a latency.

In accordance with embodiments approaches may be considered for a point-to-point communication in accordance with which a single bitstream adequate for the one end point, for example the receiver or client, is generated by the other end point, for example, the sender or server. Depending on a latency, like an end-to-end latency or a network observed in the system, one of the following approaches may be applied:

Viewport transmission: a rendered viewport, like a 2D viewport, is generated at the server side and presented directly to the client. In other words, the rendered 2D viewport is presented directly to the receiver as is. The viewport may represent the immersive media content, like a viewport for 360° video, for volumetric video, or 3D computer graphics. This may be done if the latency is below a certain threshold.

Immersive content transmission:
  360° video/graphics:
    Projected video transmission: a part of the full 360° video is transmitted using a particular projection, for example ERP, CMP, pyramid, truncated pyramid. In accordance with embodiments, some parts may be resampled, for example for an unequal resolution CMP using region-wise packing.
  Volumetric object/video:
    3D data transmission: The full volumetric object or a part of the volumetric object is sent to the client in a 3D format such as point cloud or mesh. For example, a compressed mesh stream may be sent to the client such that the client, which has the corresponding mesh decoder, may decode and reconstruct the volumetric object and render a view of the object based on user interaction.
  3D computer graphics, e.g., games:
    A complete scene, e.g., multiple volumetric objects, may be sent in a 3D format such as multiple point clouds or meshes.

The above mentioned latency may include one or more of the following latencies:
  a network latency,
  an end-to-end latency,
  a maximum or an acceptable motion-to-photon, MTP latency,
  an MTP latency corresponding to a predefined Quality of Experience, QoE,
  MTP latency reduced by a prediction lookahead time indicative of a temporal capability of a predictor to look into the future.

Embodiments of the present invention concern a 360° video communication during which the server and client, also referred to as the sender and receiver or recipient, interact, and the sender provides video data, e.g., the bitstream including video data that matches a viewing direction of the receiver end point based on a feedback provided by the receiver When considering, e.g., the systems of FIG. 2 or FIG. 3, the receiver or client 202 is capable to obtain from the server or sender 200 video data of a 360° video dependent on the viewing direction at the client. In other words, for a 360° video communication with the server 200, the client 202 obtains from the server video data dependent on a certain viewing direction of a 360° video, and displays the video data representing the certain viewing direction of the 360° video.

In accordance with embodiments, the client 202, for obtaining the video data from the server 200, may signal to the server 200—see the double-headed arrow in FIG. 2 or the connection from the client device 208 of the client 202 to the controller 206 of the server 200 in FIG. 3—the certain viewing direction of the 360° video, and receive from the server 200 the video data for the certain viewing direction of the 360° video.

In accordance with further embodiments, the client includes, as is depicted in FIG. 3, the display device 210, e.g., a HMD, to display to a user the video data for the certain viewing direction 214 of the 360° video, the sensor 218 to detect the viewing direction of the user, and the client device or processor 208 to signal the detected viewing direction to the server and to process received video data associated with the signaled viewing direction for display on the display device 210.

For the 360° video communication with the client 202, the server 200 receive from the client 202 an indication of a certain viewing direction of a 360° video at the client 202, and transmits video data for the certain viewing direction 214 of the 360° video to the client 202.

The above described embodiments are advantageous in that the video data for a particular viewing direction of a scene of a 360° video are transmitted—responsive to the actual viewing direction at the client so that less video data needs to be transmitted and/or processed when compared to conventional approaches. Thus, delays causing a decrease in the real time experience or, more general, in the Quality of Experience, QoE, of a user may be reduced or avoided.

Further embodiments of the present invention define mechanisms and signaling that allow for an improved and more efficient 360° video communication by extending the above-described protocols, e.g., the RTP, RTCP and SDP protocols. According to embodiments, extension mechanisms for RTP and RTCP packets as well as new attributes for SDP are defined so as to achieve the inventive approach of providing improved and more efficient mechanisms and signaling for 360° video communication.

Embodiments of the present invention concern embodiments providing for a 360° video communication session different media formats or processing modes for the video data, namely rendered video data and projected video data, and embodiments for switching between the rendered video data and the projected video data dependent on a latency.

Two approaches may be considered for a point-to-point communication in accordance with which a single bitstream adequate for the one end point, for example the receiver or client, is generated by the other end point, for example, the sender or server. Dependent on the end-to-end latency that is seen in the system one of the following approaches may be applied:
  viewport transmission: a rendered 2D viewport is generated at the server side and presented directly to the client,
  projected video transmission: a part of the full 360° video is transmitted using a particular projection, for example ERP, CMP, pyramid, truncated pyramid. In accordance with embodiments, some parts may be resampled, for example for an unequal resolution CMP using region-wise packing.

The latency dependent switching between viewport transmission and immersive content or projected video transmission are now be described in more detail. One of the critical aspects to be taken into account, for example when considering a virtual reality service, is the motion-to-photon, MTP, latency. The MTP latency may be considered the time needed for a user movement to be fully reflected on a display screen. In other words, the time needed to reflect a movement on a screen of a virtual reality headset when the user makes a corresponding movement, for example starts looking to the left, is the MTP latency. To provide for a good or acceptable Quality of Experience, QoE, a low MTP latency, for example less than 15-20 ms, is needed. When considering a scenario, in which the entire 360° video, the entire volumetric object, or the entire 3D object (computer-generated) is available at the client and in which the client is responsible for rendering the appropriate viewport for presentation to the user, the network latency is not critical. In other words, in such a scenario, to provide for a good or acceptable QoE, the internal latency, e.g., the latency associated with the processing at the client when reacting to a change in a viewing orientation of the user, is to be below the MTP latency. This is now described in more detail with reference to the presentation of a 360° video or a 360° video communication as an example of the immersive media communication or immersive media content presentation.

However, when considering 360° video communications, in which the sender end point provides the bitstream to match a viewing direction of the receiver end point based on a feedback provided by the receiver end point, the latency of the network is also to be considered so that the sum of the internal latency and the network latency is to be below the MTP latency to achieve a good or acceptable QoE.

Figure 4:
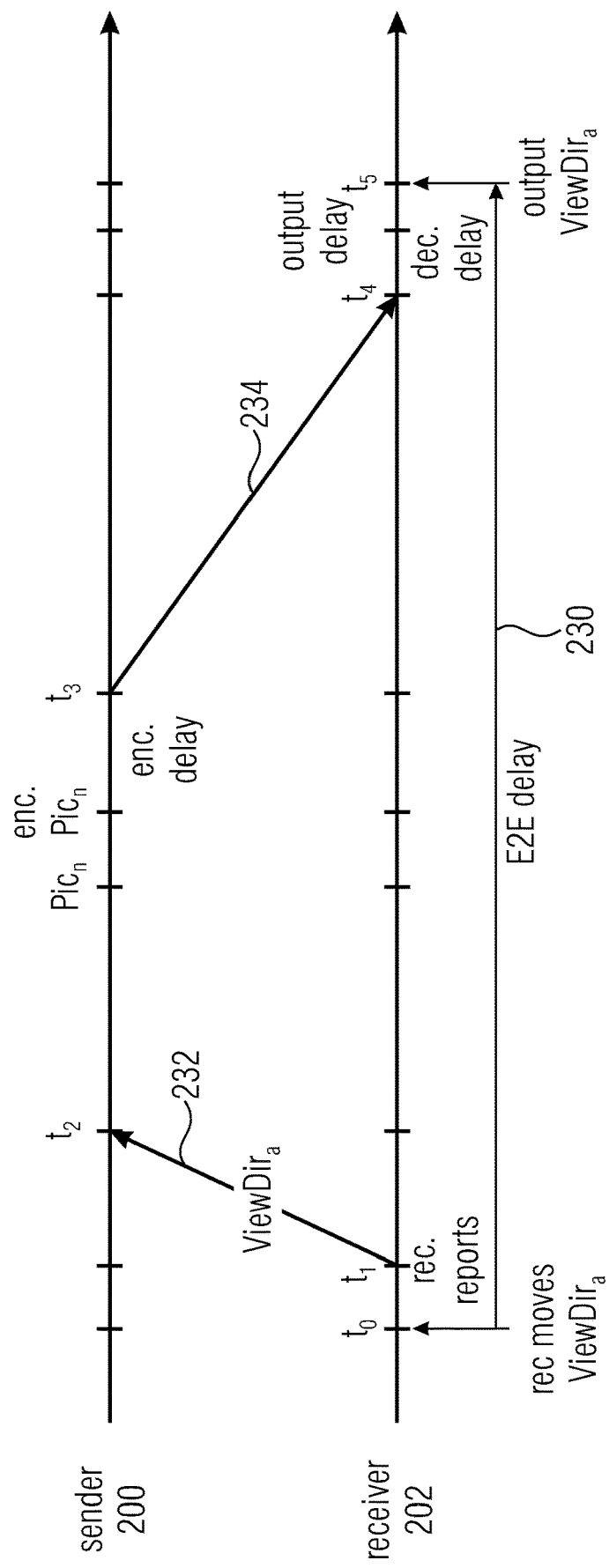
FIG. 4 illustrates a viewport transmission delay during a 360° video communication in which the sender provides the bitstream including the video data matching the viewing direction at the receiver.

FIG. 4 illustrates the viewport transmission delay during a 360° video communication in which the sender 200 provides the bitstream including the video data matching the viewing direction at the receiver 202. In the example of FIG. 4, at a time t0, the receiver 202 detects a change in the viewing direction, for example by movement of the HMD 210 on the basis of a signal from the sensor 218. After processing the detection of the change in viewing direction, at a time t1, the receiver 202, via the network 204, reports to the sender 200 the new viewing direction ViewDIR$_a$ and the respective receiver report is received at the sender 200 at a time t2. The receiver processes the 360° video data it has stored in its memory 220, for example, by means of the controller 206 so as to provide the video data for the picture Pica representing the new viewing direction ViewDIR$_a$. The picture Pic$_n$ is encoded by the server 200 and after the encoding, at the time t3, the video data is transmitted over the network 204 to the receiver receiving the encoded video data Pic$_n$ at t4. The receiver 202, for example by means of the controller or client device 208, decodes the received video data representing Pic$_n$ and following the decoding delay the new viewing direction ViewDir$_a$ is output at time t5 on the display 212. FIG. 4 illustrates the end-to-end, E2E, delay 230 between the detection of a change of the viewing direction at time t0 until the new viewing direction is presented on the display 212 at time t5.

In FIG. 4, the arrows 232 and 234 represent the network delay. As is indicated in the example of FIG. 4, the respective arrows 232 and 234 represent different delays since the transmitted data on the different transmission parts may have a different size. For example, the transmission 232, for example the receiver report RR, may include a few bits as it includes feedback about the change of the viewing direction. On the other hand, the transmission 234 includes more bits since the data actually transferred includes the encoded picture that represent the new viewing direction ViewDir$_a$. In accordance with other embodiments, however, the same propagation delays for the transmission 232 and 234 may be assumed.

FIG. 4 illustrates, as mentioned above, an example in which the server 200 generates a rendered viewport for transmission to the client so that the client 202 may display the received video after decoding, as is, i.e., there is no need for the client to perform any rendering of the received video data. The viewport transmission as explained above with reference to FIG. 4, is acceptable as long as the E2E delay 230 is smaller than 15-20 ms or the MTP latency or than a maximum or acceptable MTP latency yielding, e.g., a predefined Quality of Experience, QoE. Otherwise, as mentioned above, the Quality of Experience is below a good or acceptable level. The table below summarizes some exemplary delays indicating in ms the duration of the Feedback$_{Latency}$ of the transmission 232 and the PictureTrans$_{Latency}$ of the transmission 234. The column Rest indicates the duration of the internal latencies or remaining latencies indicated in FIG. 4, namely the latencies between detecting the change in viewing direction and reporting it to the sender, the processing time at the sender for generating the new video data and the processing time at the receiver for processing the received new picture data, i.e., the times between t0 and t1, between t2 and t3, and between t4 and t5.

| Feedback$_{Latency}$ | PictureTrans$_{Latency}$ | Rest | E2E | OK? |
|---|---|---|---|---|
| 2 | 10 | 3 | 15 | Yes |
| 4 | 12 | 3 | 19 | Yes |
| 7 | 15 | 3 | 25 | No |
| 9 | 17 | 3 | 29 | No |
| 2 | 10 | 8 | 20 | Yes |
| 4 | 12 | 8 | 24 | No |
| 7 | 15 | 8 | 29 | No |
| 9 | 17 | 8 | 33 | No |

The column E2E indicates the combined latencies associated with the messages 232, 234 and the remaining processing durations. The last column indicates the E2E delay to be the acceptable "Yes" if E2E is below or equal the MTP latency, or to be not acceptable "No" if E2E is above the MTP latency. Thus, dependent on the respective latencies, the viewport transmission may not be suitable in each situation.

Figure 5:
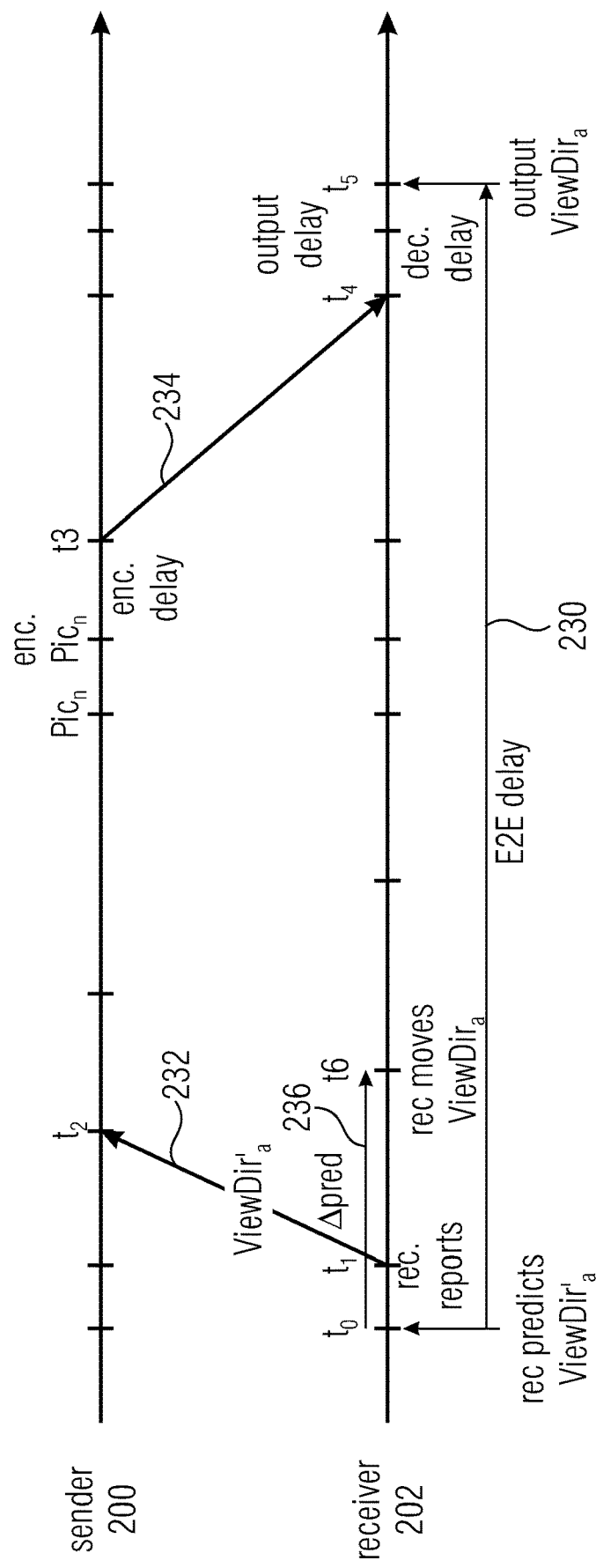
FIG. 5 illustrates a viewport transmission delay during a 360° video communication in which the sender provides the bitstream including the video data matching the viewing direction at the receiver when applying viewport prediction techniques.

In accordance with embodiments, a viewport prediction technique may be applied so as to improve the viewport transmission approach explained above with reference to FIG. 4 and to allow to meet the MTP requirements despite latencies being above the 10-20 ms threshold. In accordance with other embodiments, e.g., in case of 6DoF contents, instead of or in addition to the viewport prediction, viewpoint prediction technique may be applied. This approach may be applied in situations where the prediction of the viewport is possible with a high accuracy. FIG. 5 illustrates an example for a viewport transmission in a system, as it is, for example, depicted in FIG. 3 using viewport prediction techniques. FIG. 5 is similar to FIG. 4, except at time t0, there is no actual change in the viewing direction detected by the sensor 218, rather, a prediction is carried out, for example, by the controller 208 of the client 202, indicating a new viewing direction, ViewDir'$_a$ that is predicted to occur at the time t6 after the prediction period Δpred 236. In the same way as described above with reference to FIG. 4, at time t1, the predicted viewing direction ViewDir'$_a$ is reported to the sender which generates the video data for the new picture Pica which is encoded and transmitted at time t3 to the receiver 202. At the time t4, the change in viewing direction already occurred, and the new picture, after the output delay, is displayed on the display 212 at time t5. Δpred 236 is the temporal capability of the predictor to look into the future, also referred to as the look-ahead time. The Look-ahead time may be defined as the time difference between a future time instance for which the viewport is predicted with a certain accuracy and the current time instance. The prediction duration Δpred 236 may be subtracted from the E2E delay 230. Taking into account those cases from the previous table described with reference to FIG. 4, which were not feasible to meet the MTP requirements, when applying the prediction techniques, the following table shows that for some of these cases, by employing the prediction times, an acceptable overall delay may be achieved.

| Feedback$_{Latency}$ | Picture Trans$_{Latency}$ | Rest | E2E | ΔPred | E2E-ΔPred | OK? |
|---|---|---|---|---|---|---|
| 7 | 15 | 3 | 25 | 5 | 20 | Yes |
| 9 | 17 | 3 | 29 | 5 | 24 | No |
| 4 | 12 | 8 | 24 | 10 | 14 | Yes |
| 7 | 15 | 8 | 29 | 10 | 19 | Yes |
| 9 | 17 | 8 | 33 | 10 | 23 | No |

With regard to FIG. 3, it is noted it is assumed that the receiver 202 performs the viewport prediction, however, in accordance with other embodiments, the prediction may be performed at the sender side. In case the sender and the receiver allow for carrying out a prediction, the sender 200 and the receiver 202 may negotiate which side performs the prediction, for example at the beginning of the 360° video communication session.

In the above-described embodiments for the viewport transmission approach, it is assumed that a user's pose is tracked by the HMD 210, and the receiver 202 signals the viewport information to the sender 200, for example using RTCP messages. In return, the sender 200 adaptively renders a viewport of the receiver, encodes the rendered 2D video corresponding to the viewport and transmits the rendered 2D for display at the receiver 202. In accordance with further embodiments concerning 360° video, the rendered video as provided by the server 200 and forwarded to the receiver 202 may be an over-provisioned version of the viewport of the user at the client 202, dependent on the latency information provided by the receiver 202 towards the sender 200. In other words, in case the latency is high, so that the MTP latency may not allow for a good Quality of Experience, as is indicated in the above tables in the last column marked "No", it may be possible to add a further margin or fallback region around the actual viewport so that sending the rendered 2D version of the viewport is still possible within the MTP latency requirements. However, the over-provisioning of the rendered 2D version of the viewport may work as long as the margins added are not very large, i.e., the actually rendered video at the receiver corresponds to a viewing direction slightly different than the one used at the sender side so that small correction factors are required at the receiver side, like image processing of the decoded image or picture at the receiver. As may be seen from the above discussion of the viewport transmission approach for providing updated video data from the server to the receiver, whether the actually used 2D viewport transmission is adequate or not depends on the E2E latency which may be measured by the sender and the receiver through the exchange of RTCP report messages.

To address situations in which the rendered 2D viewport transmission by the server towards the client may not be possible due to the E2E latency being longer than the MTP latency requirements, in accordance with embodiments, rather than providing the rendered 2D viewport transmission, the sender also provides, for example, upon setting up the immersive media session or the 360° video communication session, a non-rendered part of the immersive media content, like the full 360° video data. For example in addition to the actual configuration of providing a viewport transmission, a potential configuration may be provided, in accordance with which a part of the immersive media content, like the full 360° video data is transmitted without being rendered by the server for rendering at the client for presenting it to the user, e.g., via the HMD 210 or another device for displaying the video data.

In accordance with further embodiments, there may be a negotiation between the server 200 and the client 202 using, e.g., the Session Description Protocol, SDP, and the server 200 may describe one or more parameters of the immersive media content, like the 360° video or the 3D content in the case of a volumetric video or in case of computer-generated graphics, e.g., Supplementary Enhancement Information, SEI, messages indicating, in case of 360° video one or more of a projection type, a rotation and region-wise packing, RWP, constraints. For example, at the beginning of a session of the 360° video communication, the server 200 and the client 202 may negotiate the actual parameters or parameter values of the immersive media content, like the 360° video, used by the client 202. During the negotiation the client 202 may provide, using for example he SDP, one or more additional parameters of the immersive media content, like the 360° video, according to the capabilities of the apparatus, and/or may modify or remove one or more of the parameters of the immersive media content, like the 360°, video according to the capabilities of the apparatus. In other words, a negotiation may be performed whether a 2D version of the viewport or a projected 360° video or the 3D content, in the case of a volumetric video or computer-generated graphics, is transmitted based on the endpoint capabilities and suffered delays. This means that a sender may offer a 2D viewport version and a projected version of the 360° video/3D content and depending on a measured delay and, e.g., prediction capabilities, a receiver may determine whether to accept the 2D viewport version or the 360° projected version/3D content. At the beginning of an immersive media session, an SDP negotiation may occur to decide whether a (optionally cropped) projected 360° video/3D content is be delivered or just a 2D video matching to the viewport.

In accordance with embodiments concerning 360° video, the client may negotiate the Region-Wise Packing (RWP) parameters during the SDP negotiation by including one or more new elements or modifying the sprop-sei line. This allows the client to constrain the RWP formats according to its capabilities. For example, the client
- may be able to process only up to a certain number of regions, and/or
- may only allow packed or projected regions constrained in height or width, and/or
- may understand only certain transform types, e.g., among scaling, rotation or mirroring, and/or may only allow none or some or all of the packed regions to have a guard band area around them.

The client may include, for example, the following one or more new RWP parameter related elements to constrain the possible RWP formats:
rwp-max-num-packed-regions,
rwp-min-proj-region-width/height,
rwp-min-packed-region-width/height,
rwp-allowed-transform-types,
rwp-guard-band-flag-constraint,
rwp-max-scaling-factor.

In accordance with other embodiments, instead of or in addition to the RWP parameters, lens or distortion parameters assisting a successful warping may be part of the SDP capability negotiation.

The capabilities of the client 202 may include the capabilities for processing the received projected video data, like rendering the video data, removing overprovisioning and the like.

During the session and based on the SDP negotiation, the sever 200 may encode the projected video according to the parameters or constraints specified by the client.

It is noted that the above described negotiations are not limited to the embodiments providing the rendered 2D viewport transmission and a non-rendered part of the immersive media content, like the full 360° video, data, rather, the above described negotiations may also be employed in combination with the other embodiments described herein.

In accordance with embodiments, the sender may provide a 2D viewport version as well as the immersive media content, like a projected version of the 360° video, and at the beginning of the session, an SDP negotiation may be performed concerning the above described parameters of the 360° video and/or parameter sets, like the video parameter set, the sequence parameter set and the picture parameter set as defined, for example, by RFC 7798. In accordance with embodiments, the server 200 may send, using for example the SDP, both media versions as represented below (The SDP description below describes an offer between a projected 360° video and a 2D rendered video but is equally applicable for any kind of immersive media content).

v=0
o=johndoe 25678 423582 IN IP4 192.0.2.1
s=360 video communication session
c=IN IP4 192.0.2.1
a=sendonly
m=video 49170 RTP/AVP 97 98
a=tcap:1 RTP/AVPF
a=pcfg:1 t=1
a=rtpmap:97 H265/90000
a=fmtp:97 level_id=120;
  sprop-vps=<vps data #0>;
  sprop-sps=<sps data #0>;
  sprop-pps=<pps data #0>;
  sprop-sei=<required SEI: ERP,CMP,sphere rotation,region-wise
    packing>
a=rtpmap:98 H265/90000
a=fmtp:98 level_id=120;
  sprop-vps=<vps data #0>;
  sprop-sps=<sps data #0>;
  sprop-pps=<pps data #0>;

As is indicated in the m-line, the provided video data has the SDP payload types 97 and 98 for the two different formats: projected 360° video and 2D rendered video, respectively. For the projected 360° video in payload type 97, in addition to the data representing the video parameter set, the sequence parameter set and the picture parameter set, as defined, for example, by RFC 7798, also the characteristics of the projected video are indicated using, for example, supplementary enhancement information, SEI, messages, indicating, in accordance with embodiments, the projection type, the rotation and/or region-wise RWP packing constraints. These characteristics may be included in the sprop-sei parameter as defined in the RTP payload format for HEVC, RFC 7798. On the other hand, the payload type 98 for the 2D rendered video includes the respective above-mentioned parameter sets vps, sps and pps.

More generally speaking, in accordance with embodiments, an SDP negotiation may include at least the following attributes for the different payload types:
a=rtpmap: <payload type><encoding name>/<clock rate>
a=fmtp: <payload type>
  sprop-vps=<vps data #0>;
  sprop-sps=<sps data #0>;
  sprop-pps=<pps data #0>; and
a=rtpmap: <payload type><encoding name>/<clock rate>
a=fmtp: <payload type>
  sprop-vps=<vps data #0>;
  sprop-sps=<sps data #0>;
  sprop-pps=<pps data #0>;
  sprop-sei=<required SEI: ERP, CMP,
sphere
    rotation, region-wise packing>

During the session of the 360° video communication, the client may receive respective video data packets, like Real Time Transport Protocol, RTP, packets from the server. In case the client, during the negotiation, accepted the different video formats as provided by the server, the client may send to the server a message, e.g., an RTCP packet, requesting the other format, either immediately or at a certain time following the RTCP packet. The server, responsive to the request, provides the video data in the requested format.

In accordance with further embodiments concerning volumetric video/computer-generated graphics, the identification of the volumetric versus the 2D rendered video may be done by the presence of SEIs, like the sprop-sei parameter, by an indication of a particular video codec or profile, or by an additional attribute in the SDP, such as, e.g., "videoformat 6DoF" or "videoformat Volumetric".

In accordance with embodiments, the SDP may contain association information that indicates that the 2D rendered video represents a scene corresponding to a specific position and viewing direction, so that the client may select, if more appropriate, to represent the immersive media content by the 2D rendered video. In that case, some information may be exchanged between the sender and receiver, like a position and a viewing direction (with some frequency) or a prediction of viewing direction as discussed in more detail below.

In case of a volumetric scene, there may be multiple volumetric objects each potentially consisting of several bitstreams. For example, if V-PCC is used, an object may have at least a texture bitstream and a geometry bitstream. If a mesh-based content representation is employed, there may be a compressed mesh and texture bitstream. In such cases, the SDP may contain information about the different kind of bitstreams, e.g., texture, geometry, and, in accordance with further embodiments, variants of the bitstream (s). For example, there may be multiple texture bitstreams to represent the object in a more detailed way, e.g., different texture "layers" in V-PCC. For each object, the relevant bitstreams may be associated with each other using existing grouping mechanisms of SDP as described below.

In accordance with further embodiments, rather than indicating two media formats as described above, in accordance with the further embodiments, a single payload data may be signaled that may be switched dynamically from one mode to another mode. In other words, the data as provided by the server remains during a session, however, the processing mode changes between rendering at the server for transmitting 2D video data and providing the immersive media content, like the projected video data. An example of a corresponding SDP negotiation case of 360° video is indicated below.

v=0
o=johndoe 25678 423582 IN IP4 192.0.2.1
s=360 video communication session
c=IN IP4 192.0.2.1
a=sendonly
m=video 49170 RTP/AVP 97
a=acap:1 dynamicallySwitched2DOrProjected
a=pcfg:1 a=1
a=rtpmap:97 H265/90000
a=fmtp:97 level_id=120;
   sprop-vps=<vps data #0>;
   sprop-sps=<sps data #0>;
   sprop-pps=<pps data #0>;
   sprop-sei=<required SEI: ERP,CMP,sphere rotation,region-wise packing>

In the above-described embodiment, as may be seen from a comparison to the previous embodiment, in the m-line a single video format is indicated, namely format 97, indicative of a projected 360° video format. Further, in the acap attribute it is indicated that the video format may be dynamically switched from 2D to Projected.

More generally speaking, in accordance with this embodiment, an SDP negotiation may include at least the following attributes:

a=acap: <att-cap-num> dynamicallySwitched2DOrProjected; and
   a=rtpmap: <payload type><encoding name>/<clock rate>
   a=fmtp: <payload type>
      sprop-vps=<vps data #0>;
      sprop-sps=<sps data #0>;
      sprop-pps=<pps data #0>;
      sprop-sei=<required SEI: ERP, CMP, sphere rotation, region-wise packing>

In accordance with embodiments concerning 3D content, like volumetric video or computer-generated graphics, the single payload data may be signaled by a SDP negotiation as indicated below.

v=0
o=johndoe 25678 423582 IN IP4 192.0.2.1
s=Volumetric video communication session
c=IN IP4 192.0.2.1
a=sendonly
m=video 49170 RTP/AVP 97
a=acap:1 videoformat dynamiclySwitched2Dor3D
a=pcfg:1 t=1
a=rtpmap:97 H265/90000
a=fmtp:97 level_id=120;
   sprop-vps=<vps data #0>;
   sprop-sps=<sps data #0>;
   sprop-pps=<pps data #0>;
   sprop-sei=<required 6DoF SEI>

The 6DoF SEI may be derived from the SEIs of the underlying video bitstreams that construct the volumetric video/computer-generated content. For example, in the case of V-PCC, there may be different HEVC bitstreams containing texture and geometry information. In accordance with other embodiments, the 6DoF SEI may be signaled as separate metadata, e.g., using V-PCC SEI messages. In accordance with yet further embodiments, the 6DoF the SEIs or other metadata may be signaled in the SDP separately for each underlying bitstream.

In accordance with other embodiments, different media lines (m-lines) may be used in the SDP description in order to signal, e.g., texture, geometry bitstreams in case of V-PCC. The SDP has a group attribute that allows to group together several m-lines and the streams may be synchronized using "group:LS" semantics (RFC 3388). The identification of each of the components may be done either by codec parameters or profiles or by specific video formats defined, such as "videoformat geometry", "videoformat texture", etc. An example for a corresponding SDP negotiation is indicated below o=johndoe 25678 423582 IN IP4 192.0.2.1
s=Volumetric video communication session
c=IN IP4 192.0.2.1
a=group:LS 1 2
m=video 49170 RTP/AVP 97
i=This stream contains the texture bitstream
a=mid:1
a=rtpmap:97 H265/90000
a=fmtp:97 level_id=120;
   sprop-vps=<vps data #0>;
   sprop-sps=<sps data #0>;
   sprop-pps=<pps data #0>;
   sprop-sei=<required texture SEI>
m=video 49170 RTP/AVP 98
i=This stream contains the geometry bitstream
a=mid:2
a=rtpmap:98 H265/90000
a=fmtp:98 level_id=120;
   sprop-vps=<vps data #0>;
   sprop-sps=<sps data #0>;
   sprop-pps=<pps data #0>;
   sprop-sei=<required geometry SEI>

In accordance with yet another embodiment, multiple volumetric/computer-generated objects may be present in a scene. Each such object may consist of different components, e.g., texture, geometry, and the bitstreams corresponding to the different components of each object may be grouped together and described in the SDP description. In other words, the SDP description may include multiple groups each describing a set of bitstreams, e.g., texture, geometry, that construct one volumetric/computer-generated object. During the SDP negotiation, multiple such objects may be offered and the receiver may request certain objects, e.g., by indicating the respective group IDs, in its answer.

During the immersive media content session, like the session of the 360° video communication, the client may receive respective video data packets, like Real Time Transport Protocol, RTP, packets from the server. In case the client, during the negotiation, accepted the dynamic switching from one mode to another mode, the client may send to the server a message, e.g., an RTCP packet, requesting the switching of the modes, either immediately or at a certain time following the RTCP packet. The server, responsive to the request, may provide a marked or otherwise modified video data packet, e.g., using an RTP header extension, so as to indicate a switching between the 2D video data and the projected video data. For example, to make the client aware of a change in the way the immersive media content, like the 360° video, is represented (e.g., 2D vs. projected) the RTP packet at which the switch happens may be marked as a switch packet so that the relevant rendering information may be taken into account early enough by the client. This may be done, for example, with an RTP header extension.

In accordance with embodiments, the server may indicate ahead of time that a mode switch occurs after a certain period of time, e.g., expressed in time, number of pictures or packets, i.e., that there is a certain time until switching between the 2D video data and the immersive media content, like the projected video data, e.g., at a certain instance in time or at a certain time period following the transmission of the switch packet so that the receiver may schedule switching operation modes accordingly.

In accordance with other embodiments, the receiver may trigger a dynamic switching during the session from the immersive media content, like the projected video, to the pre-rendered 2D video and vice versa, i.e., while maintaining use of the single payload type described above, by sending an appropriate RTCP feedback message asking the server for scheduling a format change, e.g., from the immersive media content, like projected, to pre-rendered 2D video. In such an embodiment, the switch video data packet may indicate an immediate switching between the 2D video data and the immersive media content, like the projected video data.

In accordance with yet further embodiments, responsive to the providing of different video formats or dynamically switchable video formats by the server 200, based on a latency in the system the receiver or client 202 may select one of the provided formats for requesting a change from one format to another format so that the viewport transmission providing the rendered 2D video viewport matching to the viewport is used in case the network latency is below a certain threshold, and otherwise the immersive media content transmission, like the projected video transmission of the 360° video data, is performed. The threshold may be the above mentioned MTP latency, or the MTP latency plus a prediction lookahead time indicative of a temporal capability of a predictor to look into the future, and may have values between 15 ms and 20 ms. Thus, in accordance with this embodiment, whether a 2D version of the viewport or the immersive media content, like a projected 360° version of the viewport, is transmitted is dependent on the delays experienced in the system. The sender provides a 2D viewport version and the immersive media content, like a projected version of the 360° video, and dependent on a measured delay or latency, like the above describe E2E delay, it is determined whether the 2D viewport version or the immersive media content, like the 360° projected version, is provided by the server 200. In accordance with further embodiments also the prediction capabilities at a receiver or at a sender may be taken into account. In accordance with further embodiments the certain threshold is one or more of:
a network latency,
an end-to-end latency,
a predefined Quality of Experience, QoE, MTP latency,
MTP latency reduced by a prediction lookahead time indicative of a temporal capability of a predictor to look into the future.

At the beginning of a session, the latency is unknown since there is no exchange of RTP or RTCP messages between the server and the client. In such a scenario the E2E latency may not be calculated using the respective RTCP reports exchanged by the server 200 and the client 202 so that, in accordance with further embodiments, the session starts with the immersive content, like the projected video in the case of 360° video or the 3D content in the case of volumetric video/computer-generated graphics, as this may be provided by the server towards the client 202 within the latency requirements and still allowing the time at the receiver for rendering the data for presenting it on the display. The immersive content, like the projected video data, is provided towards the receiver until RTCP reports are available on the basis of which the delay or RTT may be established reliably and from then on, in accordance with embodiments, dependent on a current E2E latency either the viewport transmission or the immersive content or projected video transmission is performed by the sender.

The just described embodiment of switching between viewport transmission and projected video transmission is advantageous as it allows for transmitting the video data from the server to the client in such a way that the latency is below the threshold, e.g., below the MTP latency, thereby ensuring a good quality of experience to a user to which the viewport is presented. In accordance with embodiments, the viewport transmission is the advantageous transmission mode as it does not require the client to perform any processing intensive rendering steps for presenting the image, rather, this processing occurs at the server which may have sufficient power for performing the rendering process, whereas at the receiver there may be power restraints, for example in case the device is battery-driven. In situations in which the MTP latency is longer than the desired threshold, either with or without prediction, the projected video transmission is performed so that the client receives the video data and performs rendering at the client-side.

The benefit of the 2D viewport mode is that the content can be shown with only a lightweight processing step at the receiver side before actual displaying. After decoding the 2D rendered video, in the case that an overprovisioned video is sent to the receiver, the receiver may apply cropping after decoding the video to match the video to the client FoV and accommodate for a potential prediction drift, before sending it to the display. In some cases, the receiver may apply some computationally inexpensive warping to compensate for lens characteristics, e.g., barrel/pincushion distortion in the decoded image when cropping asymmetrically.

On the other hand, in the case of the projected video, the decoded picture has to go through a thorough rendering step that involves a typical 360 projection or processing region-wise packed video data, i.e., a reconstruction of the original image from a mosaic of arbitrary transformed sub-pictures. That process may be challenging to achieve in real time, especially if the rendering parameters (e.g., RWP) change frequently (e.g., at each frame).

In accordance with further embodiments, the required SEIs or other metadata for the projected mode may be sent either along with the 2D mode data or ahead of a switching point have the GPU renderer initialized before switching, as well as some time beforehand for the projected mode, e.g., one or two frames before the actual projected frame. Similar to the projected video case, also 3D content, like volumetric video or computer-generated graphics in 6DoF, has to go through an intensive rendering stage. Therefore, in a further embodiment 6DoF-related metadata may be sent sometime before the switching to the 3D content transmission, e.g., ahead of a switching point or along with the 2D mode data before the mode switch occurs.

In accordance with further embodiments the above-described viewport prediction mechanism and/or viewpoint prediction mechanism may be applied, either on the sender-side or on the receiver-side, thereby affecting the decision of whether the immersive content, like the projected video data, or 2D video data is to be sent. The viewport prediction refers to the prediction of the user's viewing direction at a future time instance based on, e.g., previous sensor data, analysis of the content characteristics and/or user behavior. In 3DoF cases, the user may change his viewport by, e.g., by moving his head if he is wearing an HMD. However, the user has a static viewpoint, which corresponds to the center of the sphere from which he is observing the spherical content. In 6DoF environments, where the user may perform translational movements in the space, e.g., forward/backward, up/down, left/right, in addition to the yaw, pitch and roll movements, each translational movement of the user changes the user's viewpoint. A viewpoint has a position in space, also referred to as the viewpoint position, and inside that viewpoint a user may have different viewing orientations, i.e., the user may turn his head and look around. The viewpoint changes may be constrained, e.g., to multiple discrete viewpoints which the user may access, e.g., by using a controller, or viewpoint changes may be unconstrained/free-viewpoint, e.g., similar to a real-world experience. The user may then fully navigate inside the virtual scene. Similar to the viewport prediction in 3DoF scenarios, also a future viewpoint of the user may be predicted.

In a similar way as described above with reference to FIG. 5, when applying viewport prediction and/or viewpoint prediction, the respective prediction period may be subtracted from the E2E latency, thereby providing, in case of a reliable viewport prediction and/or viewpoint prediction, possibilities for handling longer latencies in the processing and transmission of the video data to be presented to the user using the display 212 of the client 202. In accordance with embodiments, in case the prediction is performed on the receiver side, the receiver may determine a specific viewport and/or viewpoint to be requested, based, for example, on the prediction accuracy, the prediction look-ahead time and/or the RTT, and signal this to the sender, for example using a certain RTCP feedback message. The actual latency causing the switching from one payload type to another, or within the same payload type from one mode to another, may be negotiated based on the prediction capabilities of the receiver.

It is noted that the above described viewport prediction and/or viewpoint prediction is not limited to the embodiments providing the rendered 2D viewport transmission and a non-rendered part of the immersive content, like the full 360° video data, rather, the above described viewport prediction and/or viewpoint prediction may also be employed in combination with the other embodiments described herein.

In accordance with embodiments, the 2D rendered viewport may exactly match the Field of View, FoV, of the client 202, while in accordance with other embodiments, the 2D rendered viewport may include a margin around the actual viewport that may be displayed at the client which may be a certain percentage of the exact viewport. The actual margin or fallback and the dimension of the 2D rendered viewport may be negotiated between the server 200 and the client 202, for example, at the beginning of the session. For example, if the viewport size is extended, the lens/distortion parameter used for rendering may be indicated to the receiver to assist in cropping/warping the viewport. It is noted that the use of a viewport including a margin is not limited to the embodiments providing the rendered 2D viewport transmission and a non-rendered part of the full 360° video data, rather, the above described use of a viewport including a margin may also be employed in combination with the other embodiments described herein.

Embodiments of the present invention concern an exchange of viewport prediction capabilities and/or viewpoint prediction capabilities, i.e., an exchange of prediction capabilities at a sender side versus the prediction capabilities at a receiver side.

When considering cases in which both end points, namely the sender 200 and the receiver 202 as depicted, for example, in FIG. 3, may perform a prediction, it may be that the prediction mechanism of one of the end points works better than the prediction mechanism of the other one of the end points. Therefore, in accordance with embodiments, the prediction capabilities of the server 200 and the client 202 may be exchanged, more specifically both end points may describe the accuracy and look-ahead time with which they may perform the prediction. In accordance with embodiments this is done via the RTCP, and having received a feedback, FB, message including the prediction capabilities of the receiver, the sender may use this information to decide whether it accepts the prediction from the receiver or whether the sender performs the prediction. In accordance with embodiments the FB message mentioned above may include the feedback control information, FCI, of an RTCP FB message having the following format:

```
 0 1 2 3
+-+-+-+-+-+-+-+-+-+-+-+-+-+-+-+-+-+-+-+-+-+-+-+-+-+-+-+-+-+-+-+-+
| Lookahead time | Accuracy | m | zero padding |
+-+-+-+-+-+-+-+-+-+-+-+-+-+-+-+-+-+-+-+-+-+-+-+-+-+-+-+-+-+-+-+-+
```

(i) Look-ahead-time, LAT, stands for the temporal capability of the predictor to look into the future.
(ii) Accuracy stands for the prediction accuracy for the given look-ahead-time.
(iii) m is a flag indicating which side does the prediction.

In accordance with other embodiments, the FCI may include, instead of a single LAT-Accuracy pair, a list of pairs, e.g., {(LAT=100 ms, Acc=95%), (LAT=200 ms, Acc=80%),}.

In accordance with embodiments, when the receiver first performs the prediction and sends the FB message, m is set to 1. The sender then may send the FB message to the receiver, either by setting m to 0, which indicates that the sender has a better prediction capability and performs the prediction, or leaving m to be 1, which indicates that the sender accepts that the receiver performs the prediction. In other words, the sender decides which side carries out the prediction. The sender may then adapt the media encoding appropriately.

In accordance with another embodiment, the receiver may decide which side carries out the prediction. In this case, the receiver sets the flag m=1 to indicate that it will perform the prediction. Otherwise, if the receiver expects the sender to perform the prediction, it sets m=0.

The prediction information may be provided by including the a=rtcp-fb attribute with the pred type in the relevant media line and a wildcard attribute (*) may be used to indicate that the RTCP feedback attribute for prediction signaling applies to all payload types. The attribute to signal prediction information based on the RTCP FB message as an attribute in an SDP description may be as follows:

a=rtcp-fb:* pred
or, more generally:
a=rtcp-fb:* <att-name>

In accordance with another embodiment, the prediction capabilities exchange may be carried out using the SDP negotiation during which both end points, the sender and the receiver may indicate how far in the future they may perform prediction and with which accuracy. In accordance with embodiments more than one operation point may be listed, for example a prediction by 100 ms with a 90% accuracy, a prediction with 200 ms with a 70% accuracy and so on. After the negotiation, in case the receiver is selected to perform the prediction, it returns one or more feedback messages indicating the future time and the predicted viewport and/or viewpoint prediction.

In accordance with embodiments, in a 6DoF communication scenario, the prediction capabilities exchange may additionally include a per-viewpoint prediction accuracy. Depending on the changing content characteristics across the viewpoints, it may be easier or harder both for the sender or for the receiver to make an accurate prediction. For example, the sender may analyze the content beforehand and determine that a certain viewpoint contains many salient areas or hotspots which the user most likely wants to view. Therefore, such a viewpoint may be classified as harder-to-predict compared to another one which contains only a few hotspots that the user may prefer to view. To signal this, the prediction capability information may also include the per-viewpoint prediction capabilities. The final decision on whether the sender or the receiver performs the prediction may be obtained by considering the number of viewpoints for which the sender or the receiver performs more accurate predictions.

In accordance with other embodiments, the prediction capability exchange may be carried out on the basis of a look-ahead time together with an average or maximum drift in the samples per second. In addition to the prediction capability exchange, e.g., during a negotiation phase, parameters to be exchanged between the sender and the receiver for supporting the prediction may be agreed upon.

In case the sender is to perform the prediction, the receiver may send feedback about the viewing direction, the reporting interval, the speed, the acceleration and the like.

In accordance with embodiments, the receiver may be moving in a 6DoF scene that includes multiple viewpoints. If the receiver is chosen to perform prediction, the receiver may analyze the previous sensor data and determine whether a switch is more likely to occur inside the viewpoint that the receiver is currently viewing, i.e., a viewport switch is more likely, or whether it is more likely that the viewpoint changes. For example, the receiver may analyze the user behavior and observe that a certain behavior is more likely to lead to a viewpoint switch, e.g., a reduced exploration/looking-around inside the viewpoint which may indicate that a user has fully explored a certain viewpoint and may have increased desire to move to a new viewpoint.

In accordance with another embodiment, if the sender is chosen to perform prediction, the receiver sends feedback about its actual viewing direction and position inside the 6DoF scene, and the sender may combine the receiver's actual sensor data with the statistics of other users or content information, e.g., at which spatial area of a certain viewpoint the users are more likely to change their viewpoints.

Once it is chosen which end-point does the prediction, the format of the required feedback is exchanged in SDP between the server and the client. For example, for a sender-side prediction, the sender may only require the actual viewing direction and reporting with a given interval, or the sender may require the actual viewing direction, acceleration and the like. For example, for a receiver-side prediction, the receiver may request saliency information or statistics on most probable content, etc. In other words, during negotiation the sender and the receiver may determine feedback messages and feedback content to be exchanged.

In case the receiver is to perform the prediction, the sender, based on its knowledge about content characteristics, e.g., picture domain saliency analysis, statistical analysis of user behavior, a-priori knowledge of script scenes and the like, may provide information about viewing directions or regions to the receiver. The receiver may include this information into its receiver-side prediction process. For example, the sender may indicate the pixel coordinates of a region-of-interest or an orientation, like yaw, pitch, roll, corresponding to the certain regions to the receiver. The receiver may fuse this information from the sender with the high resolution motion or orientation information it receives from the HMD sensor 218 and provide an improved prediction compared to a prediction based on the data from the sensor 218 alone.

When compared to sensor data to be transmitted to the sender in case of a sender-side prediction, the receiver-side or client-side prediction may be advantageous because that the sensor data is available immediately or with substantially no delay and with a higher temporal resolution, for example 1000 Hz versus 90 Hz. Therefore, the receiver may provide for better prediction accuracy than the sender.

It is noted that the embodiments concerning the exchange of viewport prediction capabilities and/or viewpoint prediction capabilities are not limited to the embodiments providing the rendered 2D viewport transmission and a non-rendered part of the full 360° video data, rather, the above described the embodiments concerning the exchange of viewport prediction capabilities and/or viewpoint prediction capabilities may also be employed in combination with the other embodiments described herein.

Embodiments of the present invention concern error or drift reporting concerning a viewing orientation of a predicted video viewing orientation versus a real video viewing orientation.

In accordance with embodiments, the receiver may send, for example within an RTCP report, to the sender an error or drift indication signaling that the 2D rendered viewport or the immersive content, like the 360° projected video data, indicating a certain viewing direction or viewpoint, as provided by the sender, does not match the actual viewing orientation at the receiver. The error or drift may be used by the sender to adapt the margin or the prefetch used or may cause a change in the viewing orientation specific projection to have a larger or smaller high-quality content coverage.

The average drift may be signaled as the ratio of a predicted viewport/viewpoint and a real viewing orientation/viewpoint position over a certain time period, and the worst case drift may be signaled as the maximum drift value attained over a certain time period. The drift, like the average drift or the maximum or worst case drift, may be signaled using an RTCP extension as depicted below:

```
        0 1
+-+-+-+-+-+-+-+-+-+-+-+-+
|        drift          |
+-+-+-+-+-+-+-+-+-+-+-+-+
```

In accordance with further embodiments, in case the drift is in a certain direction, for example in the direction of a movement of the user, i.e., the predicted viewport and/or the predicted viewpoint corresponds to a smaller movement in the same direction, the direction of the drift may be signaled and the sender may adapt its prediction by adding a prefetch in the direction of the mismatch prediction leading to an asymmetric prefetch, i.e., the prefetch in one direction may be more than in another direction.

In accordance with yet other embodiments, in case the reporting of the error or drift by the receiver towards the sender occurs while operating in the rendered viewport mode, and in case the drift, for example, the average drift, is above a certain threshold for a certain duration or time period, or in case the worst drift exceeds a certain threshold, the receiver may decide to switch from the viewport transmission to the projected video transmission.

It is noted that the embodiments concerning the error or drift reporting are not limited to the embodiments providing the rendered 2D viewport transmission and a non-rendered part of the immersive content, like the full 360° video data, rather, the above described the embodiments concerning the error or drift reporting may also be employed in combination with the other embodiments described herein.

The same applies to the viewpoint or position, where the error/drift is indicated in terms of difference of current position compared to the position for which the content is sent.

Embodiments of the present invention concern the exchange of foveated rendering information between the sender and the receiver.

In accordance with embodiments, the receiver, like receiver 202 in FIG. 3, may employ foveated rendering. The receiver may share parameters of the algorithm used for foveated rendering with the sender so that the sender may produce a content that matches the operation mode of the foveated rendering.

For example, a downgrading function may be used as a parameterized function of the quality based on the distance of the center of the viewing directions, while another example is to provide region or distance thresholds that lead to downgrading of the quality of the content.

Figure 6:
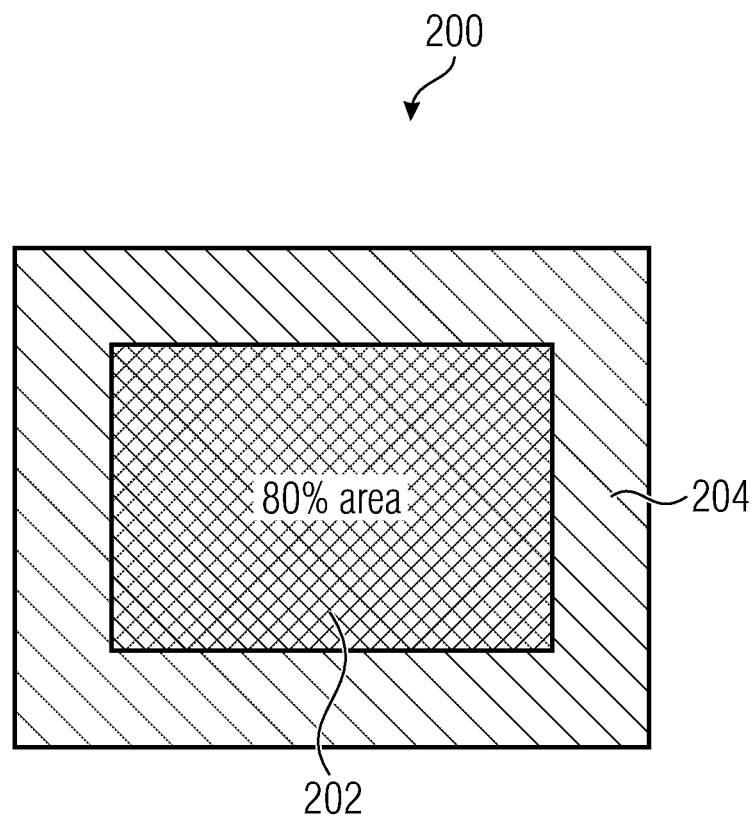
FIG. 6 illustrates a viewport with a central area to which the receiver gazes and which has a higher resolution that the outer area surrounding the central area.

Yet another embodiment is the temporal distribution of eye motion area averaged over time period. For example, when considering a situation that the receiver is gazing at an area covering 80% of the viewport in 95% of the time, the sender may decide to adapt the transmission, i.e., encode the outer parts of the viewport which are usually not gazed at by the user, with a lower pixel density, when compared to the inner part at which the user is gazing at 95% of the time. The quality may be mapped to a Quantization parameter, QP or Delta thereof or to another metric. FIG. 6 illustrates a viewport 200 with the central area 202 to which the receiver gazes and which has a higher resolution that the outer area 204 surrounding the central area 202.

It is noted that the embodiments concerning the exchange of foveated rendering information are not limited to the embodiments providing the rendered 2D viewport transmission and a non-rendered part of the full 360° video data, rather, the above described the embodiments concerning the exchange of foveated rendering information may also be employed in combination with the other embodiments described herein.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 7 illustrates an example of a computer system 500. The units or modules as well as the steps of the methods performed by these units may execute on one or more computer systems 500. The computer system 500 includes one or more processors 502, like a special purpose or a general purpose digital signal processor. The processor 502 is connected to a communication infrastructure 504, like a bus or a network. The computer system 500 includes a main memory 506, e.g., a random access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein are apparent to others skilled in the art. It is the intent, therefore, to be limited only by the scope of the impending patent claims and not by the specific details presented by way of description and explanation of the embodiments herein.

REFERENCES

RFC 3550 RTP: A Transport Protocol for Real-Time Applications
RFC 7798 RTP Payload Format for High Efficiency Video Coding (HEVC)
RFC 8285 A General Mechanism for RTP Header Extensions
RFC 4585 Extended RTP Profile for Real-time Transport Control Protocol (RTCP)-Based Feedback (RTP/AVPF)
RFC 3611 RTCP extended reports (XRs)
RFC 5968 Guidelines for Extending the RTP Control Protocol (RTCP)
3GPP TS 26.114 v16.0.0—IP Multimedia Subsystem (IMS); Multimedia telephony; Media handling and interaction

The invention claimed is:

1. An apparatus for a 360° video communication with a sender, wherein
the apparatus is to
acquire from the sender video data dependent on a certain viewing direction of a 360° video, and
display the video data representing the certain viewing direction of the 360° video,
wherein the video data comprises a margin area around a viewport,
wherein, at the beginning of a session of the 360° video communication, the apparatus is to negotiate with the sender information about the margin area of the video data, and
wherein, for the certain viewing direction of the 360° video, the apparatus is to trigger a switching during the session between
(i) first video data rendered by the sender and representing a 2D video at the certain viewing direction of the 360° video; and
(ii) second video data not rendered by the sender and representing at least a part of the 360° video to be transmitted by the sender using a certain projection.

2. The apparatus of claim 1, wherein, to acquire the video data from the sender, the apparatus is to
signal to the sender the certain viewing direction of the 360° video, and
receive from the sender the video data for the certain viewing direction of the 360° video.

3. The apparatus of claim 1, wherein the apparatus comprises
a display device to display to a user the video data for the certain viewing direction of the 360° video,
a sensor to detect the viewing direction of the user, and
a processor to signal the detected viewing direction to the sender and to process the received video data for display on the display device.

4. The apparatus of claim 1, wherein, during the session of the 360° video communication, the apparatus is to request from the sender the first video data or the second video data dependent on an end-to-end latency between the receiver and the sender.

5. The apparatus of claim 1, wherein
at the beginning of a session of the 360° video communication, the apparatus is to negotiate with the sender, and
when negotiating with the sender, the apparatus is to receive from the sender Supplementary Enhancement Information (SEI) messages indicating one or more of a projection type, a rotation and region-wise packing (RWP) constraints.

6. The apparatus of claim 1, wherein the apparatus comprises a viewport predictor providing a viewport prediction, or the apparatus is to receive from the sender the viewport prediction, the viewport prediction indicating a change from the current viewing direction of the user to a new viewing direction of the user to happen after a lookahead time.

7. The apparatus of claim 1, wherein the margin area is a certain percentage of the viewport.

8. The apparatus of claim 1, wherein, during the session of the 360° video communication, if the viewport size comprises the margin area, the apparatus is to receive an indication of a lens/distortion parameter used for rendering to assist the apparatus in cropping/warping the viewport.

9. An apparatus for a 360° video communication with a receiver, wherein
the apparatus is to
receive from the receiver an indication of a certain viewing direction of a 360° video at the receiver, and
transmit video data for the certain viewing direction of a 360° video to the receiver, wherein the video data comprises a margin area around a viewport, wherein, at the beginning of a session of the 360° video communication, the apparatus is configured to negotiate with the receiver information about the margin area of the video data, and wherein, for the certain viewing direction of the 360° video, the apparatus is to receive a trigger for a switching during the session between
(i) first video data rendered by the apparatus and representing a 2D video at the certain viewing direction of the 360° video; and
(ii) second video data not rendered by the apparatus and representing at least a part of the 360° video to be transmitted by the apparatus using a certain projection.

10. The apparatus of claim 9, wherein the apparatus is to,
in case the first video data is to be provided, render the video data, encode the rendered video data and transmit the encoded video data to the receiver, and
in case the second video data is to be provided, encode the video data using a certain projection, without rendering, encode one or more Supplementary Enhancement Information (SEI) messages indicating a projection type, a rotation and region-wise packing (RWP) constraints, and transmit the encoded video data and the encoded one or more messages to the receiver.

11. The apparatus of claim 10, wherein the apparatus is to provide to the receiver the first video data or the second video data dependent on an end-to-end latency between the receiver and the sender.

12. The apparatus of claim 9, wherein
at the beginning of a session of the 360° video communication, the apparatus is to negotiate with the receiver, and
when negotiating with the receiver, the apparatus is to send to the receiver Supplementary Enhancement Information (SEI) messages indicating one or more of a projection type, a rotation and region-wise packing (RWP) constraints.

13. The apparatus of claim 9 wherein the apparatus comprises a viewport predictor providing a viewport prediction, or the apparatus is to receive from the receiver the viewport prediction, the viewport prediction indicating a change from the current viewing direction of the user of the receiver to a new viewing direction of the user to happen after a lookahead time.

14. The apparatus of claim 9 wherein the margin area is a certain percentage of the viewport.

15. The apparatus of claim 9, wherein, during of a session of the 360° video communication, if the viewport size comprises the margin area, the apparatus is to send to the receiver an indication of a lens/distortion parameter used for rendering to assist the receiver in cropping/warping the viewport.

16. A 360° video communication system, comprising:
a sender comprising an apparatus of claim 11, and
a receiver comprising an apparatus for a 360° video communication with a sender, wherein
the receiver is to
acquire from the sender video data dependent on a certain viewing direction of a 360° video, and
display the video data representing the certain viewing direction of the 360° video, wherein the video data comprises a margin area around a viewport, and wherein, at the beginning of a session of the 360° video communication, the sender and the receiver are to negotiate information about the margin area of the video data.

17. A method for a 360° video communication, the method comprising:
receiving, at a sender, an indication from a receiver of a certain viewing direction of a 360° video at the receiver, and
transmitting, by the sender, video data for the certain viewing direction of a 360° video to the receiver,
wherein the video data comprises a margin area around a viewport, and
wherein, at the beginning of a session of the 360+θ video communication, the sender and the receiver negotiate information about the margin area of the video data, and
wherein, for the certain viewing direction of the 360+θ video, the method comprises triggering a switching during the session between
(i) first video data rendered by the sender and representing a 2D video at the certain viewing direction of the 360° video; and
(ii) second video data not rendered by the sender and representing at least a part of the 360° video to be transmitted by the sender using a certain projection.

18. The method of claim 17, further comprising:
acquiring, by the receiver, the video data from the sender dependent on the certain viewing direction of a 360° video at the receiver, and
displaying, at the receiver the video data representing the certain viewing direction of the 360° video.

19. A non-transitory digital storage medium having a computer program stored thereon to perform, when said computer program is run by a computer, the method for a 360° video communication, the method comprising:
receiving, at a sender, an indication from a receiver of a certain viewing direction of a 360° video at the receiver, and
transmitting, by the sender, video data for the certain viewing direction of a 360° video to the receiver,
wherein the video data comprises a margin area around a viewport, and
wherein, at the beginning of a session of the 360° video communication, the sender and the receiver negotiate information about the margin area of the video data, and
wherein, for the certain viewing direction of the 360° video, the method comprises triggering a switching during the session between
(i) first video data rendered by the sender and representing a 2D video at the certain viewing direction of the 360° video; and
(ii) second video data not rendered by the sender and representing at least a part of the 360° video to be transmitted by the sender using a certain projection.

* * * * *

UNITED STATES PATENT AND TRADEMARK OFFICE
CERTIFICATE OF CORRECTION

PATENT NO. : 12,041,219 B2  
APPLICATION NO. : 17/527937  
DATED : July 16, 2024  
INVENTOR(S) : Serhan Gül et al.

Page 1 of 1

It is certified that error appears in the above-identified patent and that said Letters Patent is hereby corrected as shown below:

In the Claims

Claim 9, on Column 44, Line 65:  
viewing direction of a 360θ video at the receiver, and  
Should read:  
viewing direction of a 360° video at the receiver, and Claim 17, on Column 46, Line 18:  
wherein, at the beginning of a session of the 360+θ video  
Should read:  
wherein, at the beginning of a session of the 360° video Claim 17, on Column 46, Line 22:  
wherein, for the certain viewing direction of the 360+θ  
Should read:  
wherein, for the certain viewing direction of the 360°

Signed and Sealed this  
Twelfth Day of November, 2024

Katherine Kelly Vidal  
*Director of the United States Patent and Trademark Office*